US005584980A

United States Patent [19]
Griffith et al.

[11] Patent Number: 5,584,980
[45] Date of Patent: Dec. 17, 1996

[54] ELECTRIC FIELD METHOD AND APPARATUS FOR DECONTAMINATING SOIL

[75] Inventors: Ronald J. Griffith, Wilmington, Del.; Richard C. Landis, Lincoln University, Pa.; Dale S. Schultz, Hockessin, Del.; Stephen H. Shoemaker, The Woodlands, Tex.

[73] Assignee: E. I. Du Pont de Nemours and Company, Wilmington, Del.

[21] Appl. No.: 349,213

[22] Filed: Dec. 5, 1994

[51] Int. Cl.$^6$ .............................. C25C 1/22; B01D 61/44
[52] U.S. Cl. .................... 204/516; 204/515; 204/627; 588/204
[58] Field of Search .............. 204/182.2, 180.1, 204/299 R, 515, 516, 627; 588/204

[56] References Cited

U.S. PATENT DOCUMENTS

| | | | |
|---|---|---|---|
| 3,497,439 | 2/1970 | O'Bannon | 204/180 |
| 4,582,611 | 4/1986 | Wang | 210/747 |
| 4,664,560 | 5/1987 | Cortlever | 405/258 |
| 5,037,240 | 8/1991 | Sherman | 405/128 |
| 5,074,986 | 12/1991 | Probstein et al. | 204/130 |
| 5,137,608 | 8/1992 | Acar et al. | 204/130 |
| 5,190,628 | 3/1993 | Bibler | 204/182.4 |
| 5,240,570 | 8/1993 | Chang et al. | 204/130 |
| 5,266,213 | 11/1993 | Gillham | 210/747 |
| 5,415,744 | 5/1995 | Jacobs | 204/130 |
| 5,433,829 | 7/1995 | Pool | 204/130 |

FOREIGN PATENT DOCUMENTS

| | | | |
|---|---|---|---|
| 0504551 | 9/1992 | European Pat. Off. | A62D 3/00 |
| 5-336842 | 12/1993 | Japan | A01B 47/00 |
| 2255087 | 10/1992 | United Kingdom | C02F 1/70 |

OTHER PUBLICATIONS

Probstein, R. F., "Fundamental Aspects of Removing Hazardous Materials from Soils by Electric Fields", *EPRI Project 8060 Proceedings*, Paper #5,, Jul. 1994.
Acar, Y. B. et al, "Principles f Electrokinetic Remediation", *Enviorn. Sci. Technol.*, 27(13), 2638–2650, (1993) (no month).
Trombly, J., "Electrochemical Remediation Takes to the Field", *Enviorn. Sci. Technol.*, 28(6), 289A–291A, (1994) (no month).
Hydraway® Drain Catalog (Subsurface Geocomposite Drainage Systems), MCHW–3001, Monsanto Chemical Company, 2381 Centerline Industrial Dr., St. Louis, MO 63146 (no date).
Hydraway® Drain Catalog (Subsurface Geocomposite Drainage Systems), HW–9–004, Monsanto Chemical Company, 2381 Centerline Industrial Dr., St. Louis, MO 63146 (no date).
Ho, S., "Development of an Integrated in–situ Remediation Technology", Morgantown Energy Technology Center, Sep. 1994.

*Primary Examiner*—Arun S. Phasge

[57] ABSTRACT

Disclosed is an electrokinetic soil decontamination method using closely spaced like electrode assemblies, special panel electrode configurations, an electrode emplacement process which leaves the soil in-situ, and a purge fluid conditioning and circulation process that results in reduced costs for soil decontamination. Panel electrode assemblies, tubular electrode assemblies and treatment panel assemblies are also disclosed.

33 Claims, 12 Drawing Sheets

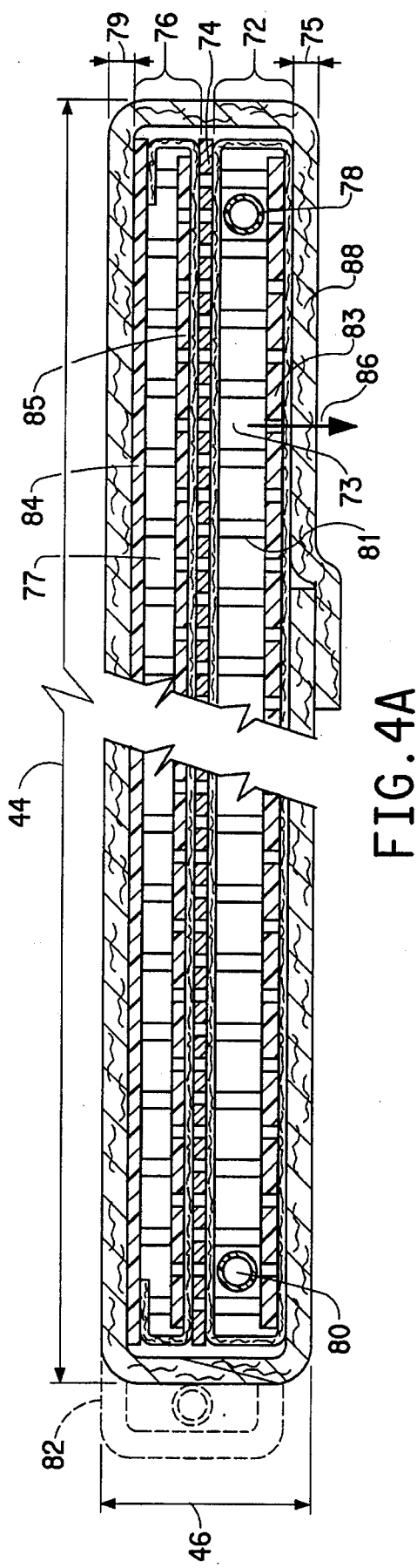
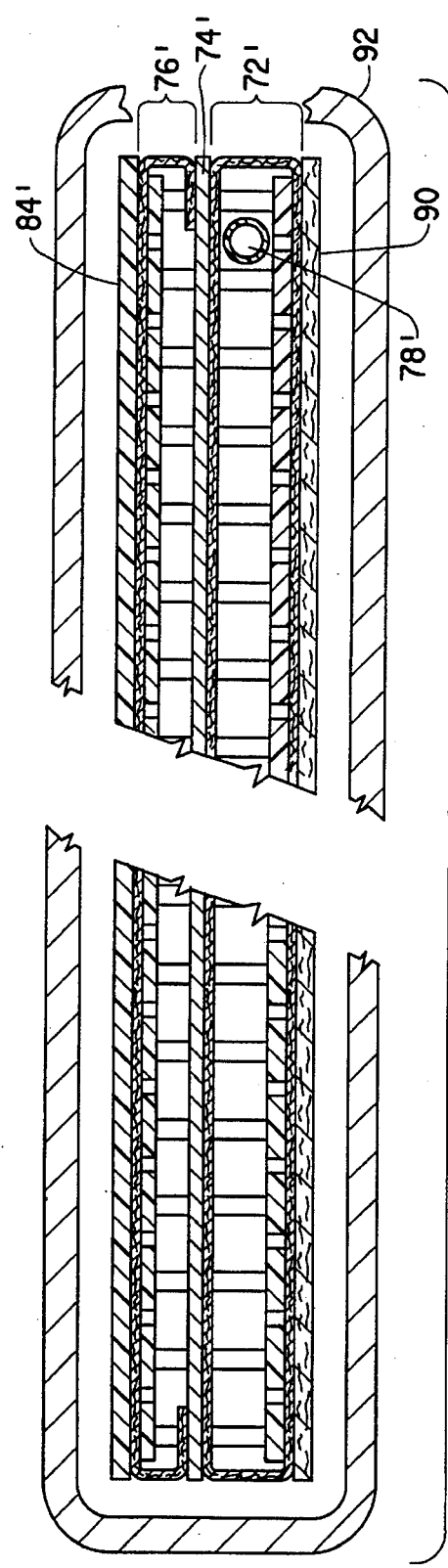
FIG. 4A
FIG. 4B

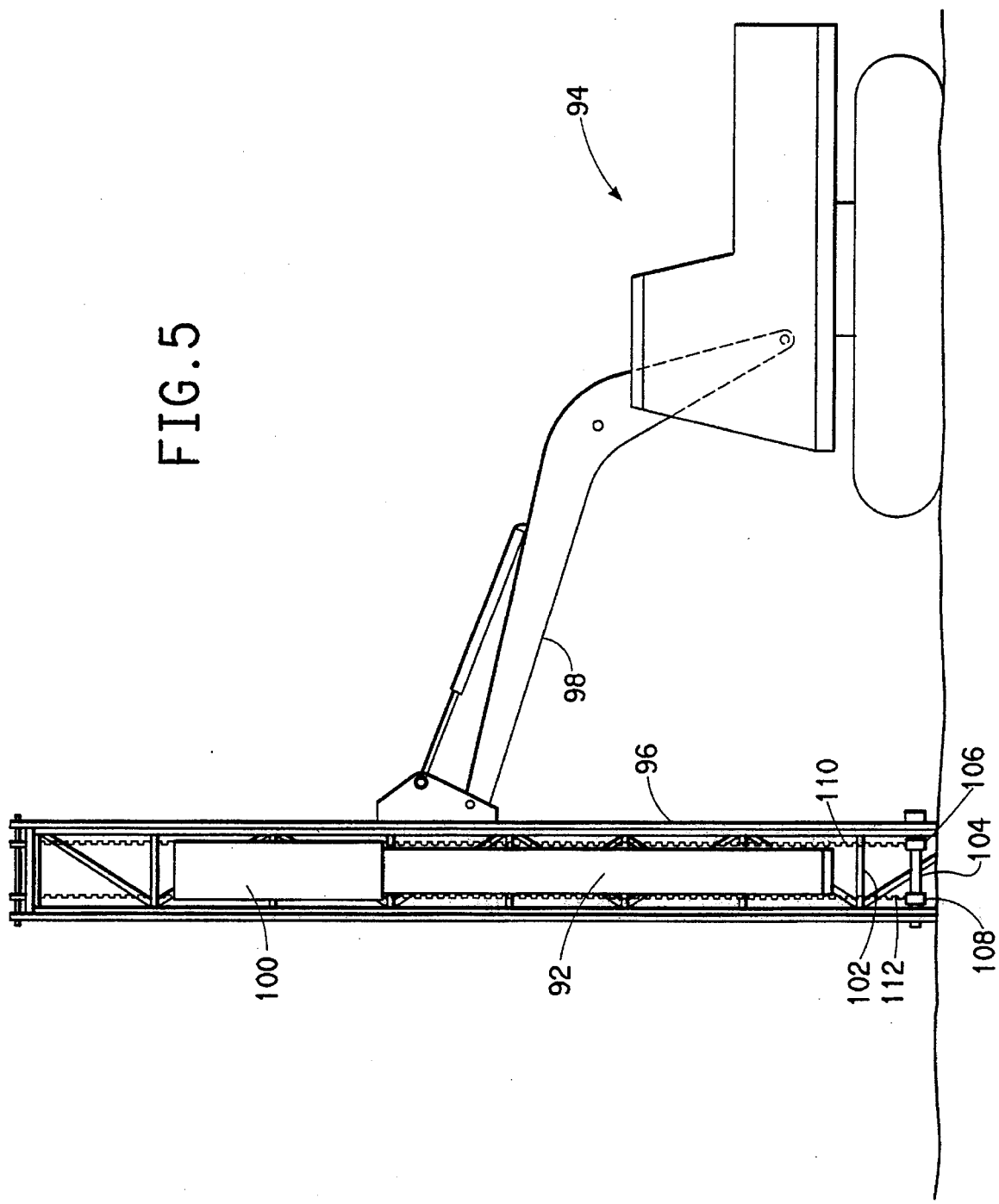

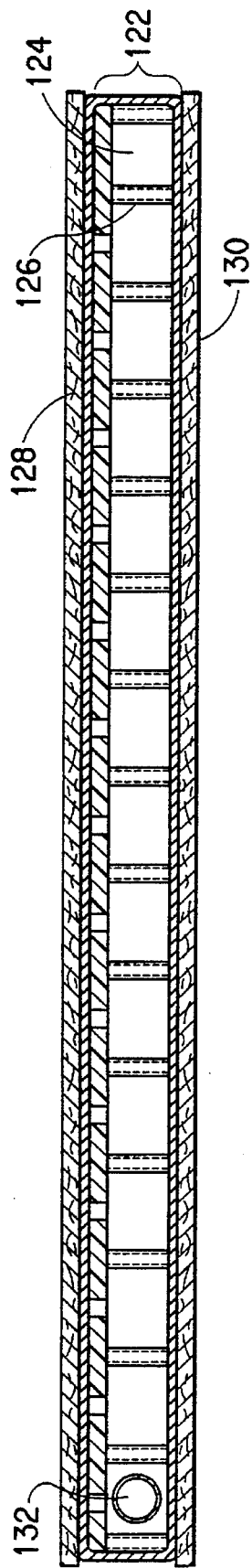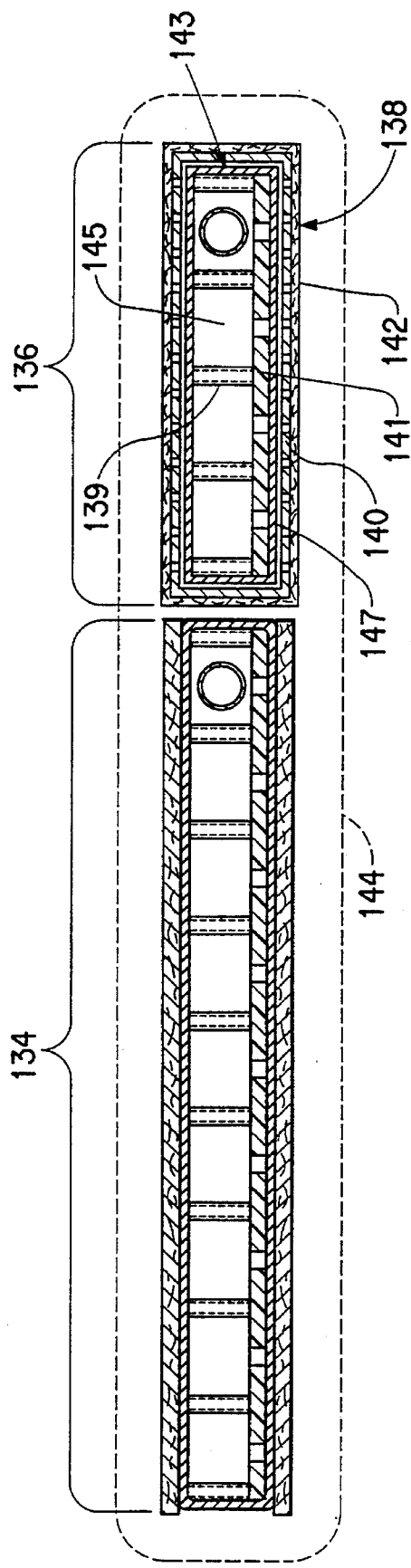
FIG. 7A
FIG. 7B

ELECTRIC FIELD METHOD AND APPARATUS FOR DECONTAMINATING SOIL

FIELD OF THE INVENTION

This invention relates generally to the removal of contaminants from hazardous waste sites and, more particularly, to the use of electroosmosis and electromigration techniques for such purpose.

TECHNICAL BACKGROUND

Many different techniques have been proposed over the years for removing contaminants from hazardous waste sites, such as contaminated soil, all of which have suffered from one or more disadvantages which have made their use either technically or economically impractical. As used herein, soil can generally be understood to mean an earth-like medium having porosities ranging from a very densely packed clay medium to a relatively loosely packed medium, such as loosely packed sand.

The excavation and subsequent treatment of contaminated soil, for example by soil washing or incineration, is a costly technique and may expose workers using such process to health risks. Moreover, in the case of soil washing, the procedure may not extract all of the contaminants attached to the clay or silt components of the soil, while in the case of incineration, a site pollution problem may be replaced by the creation of an air pollution problem.

In situ collection and injection remediation techniques have also been proposed. Collection techniques, such as the collection of a contaminant plume by pumping and/or drains, often suffer from dilution by surrounding ground water during collection, thus increasing the pumping and treatment costs. Further, effective control of the direction of the flow is generally not possible due to soil heterogeneity and cracks.

Injection techniques, such as by using chemicals or biological agents injected in situ into the soil to detoxify the wastes, suffer from the difficulty of achieving a uniform distribution of the detoxifying materials throughout the soil. Moreover, both collection and injection techniques based on the use of pressure driven liquid flows may be impossible to use in soils having low hydraulic permeability so that their use is generally limited to relatively high permeability soils, e.g., relatively sandy soils. Also, when using presently proposed in situ remediation methods, including high pressure soil flushing, vacuum or steam extraction, or radio frequency volatilization, many contaminant materials, particularly heavy metals, cannot be removed because of the strong attachment forces which bind the metals to the soil particles.

Electroosmosis has been proposed for the dewatering and consolidation of clays or other soils to provide soil stabilization, such as for construction purposes, and for the purposes of removing contaminants from soil by transporting the contaminants with the flowing water. As used herein, electroosmosis is defined as the process of moving a liquid through a porous material by the application of an electric field. In accordance therewith voltage gradients are established in the soil and the water therein is thereby caused to migrate toward and accumulate at or near one of the electrodes which are used to create the electric field therein, the accumulated water therein being removed therefrom, as by pumping.

Electromigration is a process that utilizes an electric field applied to the soil to transport contaminants by means of attracting ionic ally charged particles toward the electrodes with or without significant mass flow of fluid. Such a process is especially useful for removing metal contaminants from soil in-situ using electrodes to create an electric field. The contaminant ions may move in the same direction as the fluid flow or they may move in the opposite direction as the fluid flow in the electric field. A term that encompasses both the process of electroosmosis and electromigration is the term electrokinetics.

An electroosmosis system is described in U.S. Pat. No. 5,074,986 wherein at least one and, preferably, a plurality of porous anode electrode structures and at least one and, preferably, a plurality of porous cathode electrode structures are positioned at selected locations and at selected depths within a contaminated soil region. Such a system may also be applied to soil which has been removed from below ground and has been piled at a suitable location on the surface of the ground. The electrode structures are designed, for example, so that they are in the form of channel structures, such as tubular channels extending from the surface to below the contaminated region, the portions of the electrode structures below the surface within the contaminated region being porous, or perforated. One means of placing such tubular electrode structures in the soil would be to bore a hole in the soil and insert the electrode. In the case of a conventional well electrode, the hole would be bored, an electrode rod inserted and a porous fill, such as gravel or sand would be backfilled into the bored hole. Such boring, however, produces waste soil that must be separately decontaminated. Depending on the polarity of the charge of the soil, the electroosmotic flow can be either toward the anode electrode structures or the cathode electrode structures. In a positively charged soil, for example, electroosmotic flow will be toward the porous anode electrodes, whereas in a negatively charged soil the flow is toward the porous cathode electrodes. In the description below an electrode structure from which the flow emanates is called the "source electrode," and an electrode structure to which the flow migrates is called the "sink electrode."

A non-contaminating purging liquid, such as water, is supplied to the one or more source electrode structures so as to flow into the channel thereof and outwardly therefrom through the perforated portions thereof into the pores of the contaminated soil region. Voltage gradients are established between the source electrodes and sink electrodes by applying DC voltages thereto to create electric fields between source and sink electrodes. The contaminated liquid in the pores of the soil is displaced by, and accordingly, moved through the pores by, the non-contaminating purging liquid which purging liquid is itself moved through the pores as a result of electroosmosis. In some cases, depending on the nature of the contaminated liquid in the pores, and in particular with aqueous solutions, in addition to being moved by the purging liquid, such contaminated liquid may also be moved through the pores directly by electroosmosis.

The contaminant liquid moving through the pores flows into the one or more sink electrodes through the perforations therein and can then be removed to the surface through the sink electrode channel structures using suitable pumping or siphoning action, for example. The contaminant can thereupon be suitably collected at the surface.

By controlling the applied DC voltage levels, the number of electrode structures, and the depths and spacings of the electrode structures so as to control the directions and interaction of the voltage gradients produced between the electrode structures, the system can be operated in an effective manner, being particularly useful in waste sites having relatively low hydraulic permeabilities lying in a range of about $10^{-3}$ cm/sec. or less, comprising clays or the like.

There is a problem with the use of electrode wells or tubular electrodes that are distributed in a contaminated portion of soil in an equidistant array where the distance between like electrodes is about the same as, or sometimes slightly greater than, the distance between unlike electrodes. In this type of conventional array, it is believed that a highly non-uniform electrical field is produced because of unequal current paths between unlike electrodes. This is the so-called two-dimensional field effect versus the so-called one-dimensional field effect that has been observed in laboratory experiments with electroosmosis electrodes as reported in a paper entitled "Fundamental Aspects of Removing Hazardous Materials from Soils by Electric Fields". This paper was presented by Ronald F. Probstien at the July 1994 proceedings of the Electric Power Research Institute (EPRI) Workshop on In Situ Electrochemical Soil and Water Remediation. In the one-dimensional experiments, a small cylindrical soil sample having dilute aqueous phase organics is contained between two electrodes that form caps to the cylindrical container. In this arrangement a uniform field is produced in the soil between unlike electrodes. In this situation, after about 1.5 pore volumes of fluid is removed from the sink electrode, more than 90% of the contaminant is removed from the soil. One pore volume is the volume of liquid that can be contained in one volume of soil. In a companion two-dimensional experiment, the soil is contained in an open top rectangular box and tubular electrodes are placed near the ends of the box. In this arrangement, non-uniform convection velocities and removal rates are observed and more than 4.0 pore volumes of fluid are removed at the sink electrode before the same level of contaminant removal is achieved. The author concludes that ". . . the electroosmotic velocity distribution resulting from a particular electrode configuration determines the efficiency of the removal process, with high efficiency in the area between the electrodes, while the area outside the electrodes is not as effectively purged." In such a system using an equidistant row of electrodes, the soil must be treated for a time sufficient to remove the contaminant from the portion of soil having the longest current path. This results in great inefficiencies in electrical power consumed and in the extended time required to treat a volume of soil. It has been estimated that due to the non-uniformity of the electric field between tubular electrodes, the number of pore volumes of fluid forced through the soil sample to achieve a high decontamination level between 90–100% is about 2× to 4× that required where a uniform field is established. If the extended time to move more fluid is to be compensated for by a higher flow rate achieved by closer spacings of unlike electrodes and higher electrical currents at the same voltage, there is an economic problem that more electrodes are required and more electrical energy is required, and additionally there may also be a problem with heating of the soil at high currents that tends to boil off the water thereby creating nonconductive regions.

Another means of achieving an electrode in the ground is to dig a ditch in the ground to a suitable depth and then backfilling the ditch with electrically-conducting powder particles. Terminal electrode rods are then imbedded at suitable gaps in the powder particles to form an electrode wall in the ground. Opposing electrode walls are connected to an electrical voltage so that one of the walls acts as a cathode and one as an anode. The electroosmosis occurs between the opposite electrodes. In Japanese patent publication 5-336842 such a system is used to remove salts from soil. Such a system has a problem in that a large quantity of soil must be removed and then disposed of to provide a ditch, and the ditch depth may be limited before problems with collapse of the ditch walls during digging occurs. In cases where the soil is contaminated with a hazardous substance, handling the soil is a major concern.

Another means for cleaning contaminated ground water in soil is to pass the water through a permeable mixture of activated carbon and iron filings. The activated carbon acts to retard the contaminant while letting the water go through. The retained contaminant remains in contact with the iron filings for an extended residence time so chemical reaction with the iron filings can break down the contaminants into harmless or less hazardous substances. The permeable mixture is applied by digging a trench that extends below the water table in an aquifer in the path of a plume of the contaminant. The mixture would be backfilled into the trench. In British patent publication GB 2,255,087 A to Gilliam, such a system is used to clean halogenated organics, including chloroform, trichloroethane, solvents, pesticides, etc. from ground water. Such a system is only effective in a loosely packed soil medium that facilitates water flow by gravity induced pressure. Such a system has a problem in that a large quantity of soil must be removed and then disposed of to provide a ditch, and the ditch depth is limited to only a few feet before problems with collapse of the ditch walls during digging occurs. In cases where the soil is contaminated with a hazardous substance, handling the soil is a major concern. Further details of such a process are contained in U.S. Pat. No. 5,266,213 to the same inventor.

SUMMARY OF THE INVENTION

The invention is a method of decontaminating soil using an electric field comprising the steps of arranging a plurality of electrode assemblies in rows of source electrode assemblies spaced apart from rows of sink electrode assemblies, wherein the gap distance between like electrode assemblies within a row is less than 50% of the gap distance between unlike electrode assemblies from row to row; applying an electrical potential difference between the source electrodes and sink electrodes; and supplying fluid to the source electrode assembly and removing fluid from the sink electrode assembly.

Additionally, the method includes directing a fluid with a fluid conditioning additive to the source electrode assembly; circulating the fluid along the length of the electrode assembly; withdrawing fluid from the source electrode assembly; treating the withdrawn fluid, and; redirecting the fluid to the source electrode assembly.

In a preferred embodiment, the method includes inserting the electrodes in the soil while leaving the soil in-situ, comprising the steps of forcing a mandrel into the soil; placing the electrode assembly within the mandrel, and; removing the mandrel and leaving the electrode assembly behind in the soil.

The invention is also a preferred electrode assembly useful in removing contaminants from soil by electrokinetics comprising an elongated panel assembly having a width to thickness ratio greater than 2×, and preferably greater than 4×, the panel comprising an elongated electrode material layer having a width extending substantially across the width of the panel; a layer forming an elongated fluid circulation channel adjacent one side of the electrode layer; a permeable layer for passing fluid to and from the channel while retarding the flow of soil into the channel; means to hold at least the channel layer and permeable layer together as a laminate structure.

In preferred embodiments of the electrode panel assembly, there is a conduit disposed at one end and along a portion of the length of the panel assembly for directing fluid into or out of the channel; there is a second channel and a second permeable layer adjacent the opposite side of the electrode layer; there is a second conduit that extends from the one end and along the length of the assembly; there is an impermeable geomembrane adjacent one side of the electrode layer, and; the electrode layer is a lightweight expanded metal comprising titanium having a coating containing iridium oxide.

The invention is also a treatment assembly useful in removing contaminant from soil comprising an elongated panel assembly having a width to thickness ratio greater than 2×, and preferably greater than 5×, the panel comprising an elongated channel enclosed with a permeable geotextile for passing fluid to and from the channel while retarding the flow of soil into the channel, the channel containing a flowable solid, treatment medium for treating the contaminant in the soil. Additionally, the treatment panel may have a conduit in the channel, and it may have a permeable chamber enclosing a panel portion that can be removed from the chamber.

In a further preferred embodiment of the method, there is a step of arranging a plurality of treatment panels in a row spaced between the row of source electrode assemblies and the row of sink electrode assemblies, the treatment panels each staggered and overlapped with adjacent treatment panels. Preferably, the row is formed by forcing a mandrel into the soil while leaving the soil in-situ; placing the treatment panel within the mandrel and; removing the mandrel. The contents of the treatment panels may vary and include a variety of different treatments for the soil and may include adding and removing fluids to and from the panel.

Alternatively, the treatment method includes establishing a planar treatment wall spaced uniformly from the source and sink row of electrodes by placing a flowable treatment medium in the soil by forcing a first mandrel into the soil while leaving the soil in-situ; placing a second mandrel into the soil while leaving the soil in-situ and with a first end abutted with the first mandrel; placing the flowable treatment medium into the first mandrel; removing the first mandrel and leaving the flowable treatment medium in place; placing the first mandrel into the soil while leaving the soil in-situ and abutted with a second end of the second mandrel; placing the flowable treatment medium into the second mandrel; removing the second mandrel and leaving the flowable treatment medium in place, and; repeating the steps with the mandrel until the planar treatment wall extends for the length of the electrode rows.

The invention also includes a method using electrodes to provide electroosmotic flow to decontaminant a region of soil comprising the steps of: arranging a plurality of electrode assemblies in rows of source electrode assemblies spaced apart from rows of sink electrode assemblies; applying an electrical potential difference between the source electrodes and sink electrodes to established a current path between the electrodes an the soil; directing a fluid in an open channel between the source electrode and the soil to thereby intersect the path of the current between the source electrode and the soil.

BRIEF DESCRIPTION OF THE FIGURES

FIGS. 4A and 4B are section views of two embodiments of an elongated electrode panel.

FIG. 5 is an elevation view of a device for driving mandrels into the soil to install the elongated electrode panels.

FIGS. 7A and 7B are section views of two embodiments of an elongated treatment panel.

DETAILED DESCRIPTION OF THE FIGURES

Figure 1A:
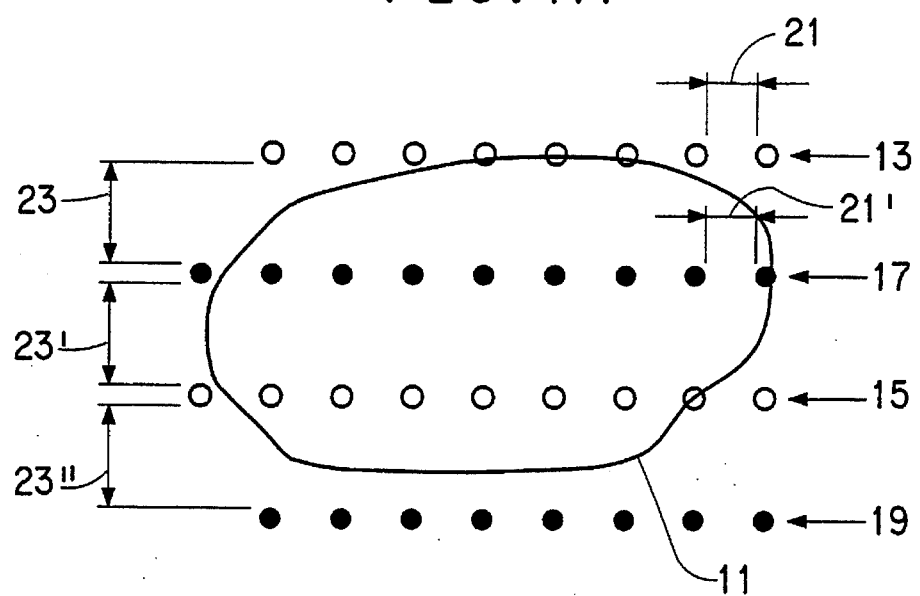
FIGS. 1A and 1B are schematic plan views of two arrangements of electrode assemblies for treating contaminated regions.

FIG. 1A shows a plan view of a contaminated region of soil 11 with an arrangement of a plurality of electrode assemblies to create an electric field in the contaminated region. There are 2 rows of first type electrode assemblies, such as anode assemblies 13 and 15. These are spaced apart from 2 rows of second type electrode assemblies, such as cathode assemblies 17 and 19. The gap distance 21 between the like electrodes in row 13, and the same distance 21' between the like electrodes in row 17, is more closely spaced than the gap distance 23 between unlike electrodes in rows 13 and 17 (the distances 23' and 23" are essentially the same as distance 23). For a substantial improvement in uniformity of the electric field, the closely spaced gap distance 21 should be less than 50% of the gap distance 23. By having the unlike electrodes spaced at a predetermined gap distance suitable for the electric potential difference expected to be applied, and the like electrodes more closely spaced, more uniform electrical fields can be expected in a contaminated soil than with other known arrangements of electrodes.

The electrodes can be conventional well electrodes, but preferably they are tubular electrode assemblies that are inserted in the soil while leaving the soil in-situ, that is, without removing soil from the contaminated region. For these types of electrodes having a cylindrical configuration, the gaps between electrodes are essentially the same as the center distance between electrodes.

Figure 1B:
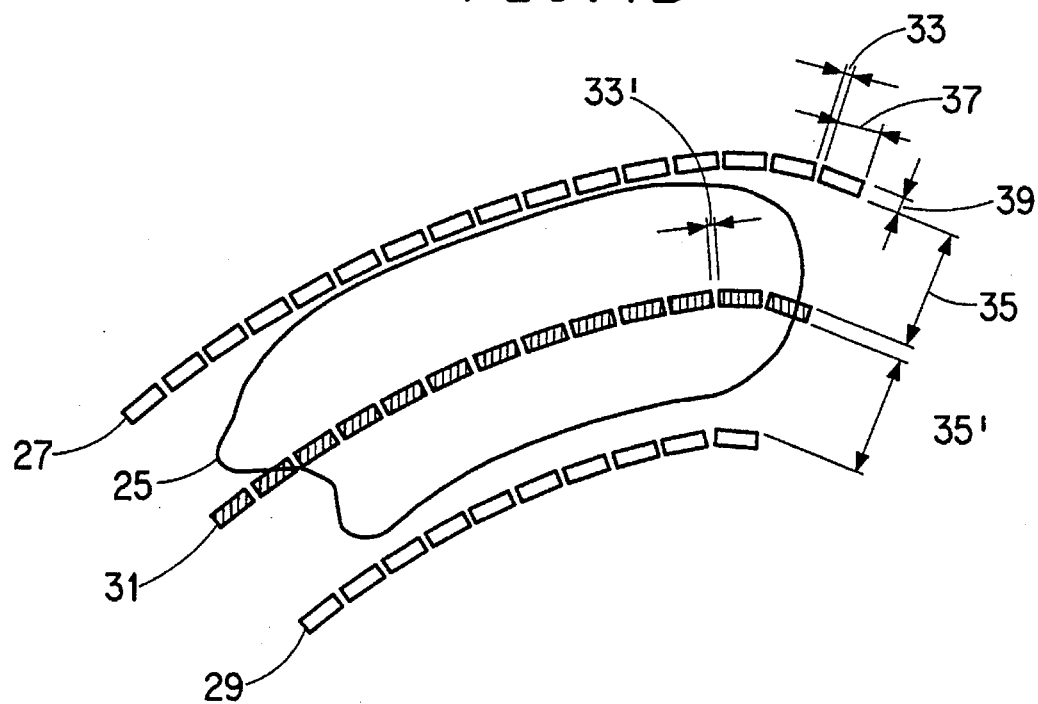

FIG. 1B shows a plan view of another contaminated soil region 25 with an arrangement of a plurality of electrode assemblies to create an electric field in the contaminated region. There are 2 rows of first type electrode assemblies, such as anode assemblies 27 and 29. These are spaced apart from one row of a second type electrode assembly, such as cathode assembly 31. The gap distance 33 between the like electrodes in row 27, and the same distance 33' between the like electrodes in row 31, is more closely spaced than the gap distance 35 between unlike electrodes in rows 27 and 31 (the distance 35' is essentially the same as distance 35). These electrodes are panel electrodes that have a width 37 greater than their thickness 39 so the gap distance 33 and 33' between like electrode assemblies is much smaller than the gap distances 35 and 35' between unlike electrode assemblies. This is believed to provide an electric field that is an improvement over conventional electric fields and is an improvement over the electric field of the tubular electrodes of FIG. 1A. This high ratio of width to thickness also makes the panel electrode assemblies easier to insert in the soil while leaving the soil in-situ, since the small area of this type cross-section displaces only a small amount of soil. The panel electrode assembly, however, may be slightly more expensive to fabricate and install than the tubular electrode assembly, so in a case where the requirement for the percent removal of the contaminant is low, the use of tubular electrode assemblies arranged as in FIG. 1A may be preferred. The arrangement of rows may be straight-line as in FIG. 1A or they may be curved-line as in FIG. 1B depending on the shape of the contaminated region and the desired economical arrangement of electrode assemblies.

To achieve the best uniformity in the electrical field, there are several considerations for the row grouping of one type and another type of electrode:

the rows should be reasonably straight with no small radius curves, although large radius curves and short staggers between adjacent electrodes are workable;

the rows should be reasonably parallel, that is, the straight lines or large radius curves should be everywhere reasonably equidistant;

the electrodes in the third dimension extending down into the soil will define or approximate planes or curved surfaces that should also be reasonably parallel.

Figure 2A:
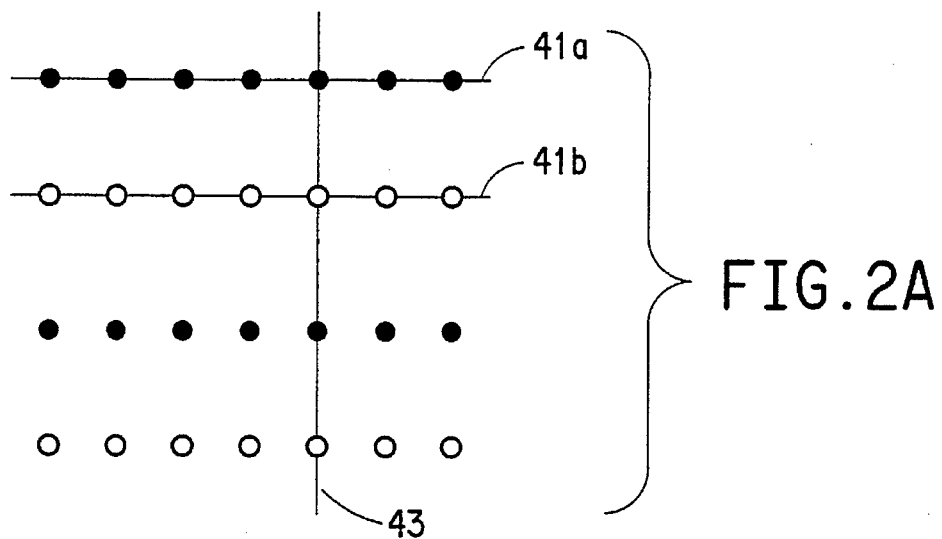
FIGS. 2A–2H are schematic plan views of electrode arrangements that illustrate different choices for rows of electrodes.
Figure 2B:
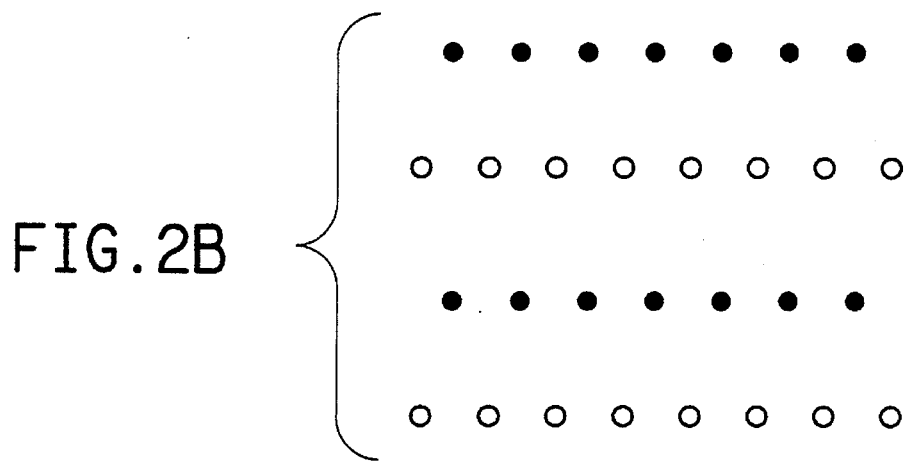
Figure 2C:
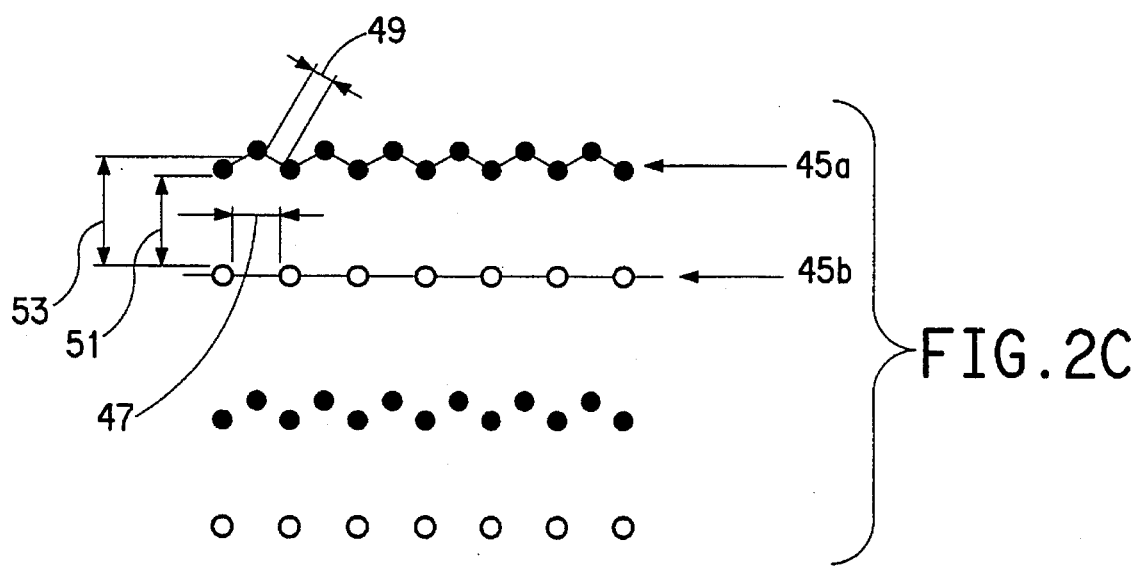

For instant, in FIG. 2A, the row grouping is an arrangement of rows of tubular electrode assemblies, such as row 41a of one type electrode (represented by the dark shapes) and an adjacent row 41b of another type electrode (represented by the open shapes). The row can be defined by drawing a line connecting an electrode of one type and the next closest electrode of the same type without passing through an electrode of another type or crossing lines drawn between electrodes of another type. The lines drawn connecting the electrodes of another type should be generally parallel to the lines drawn connecting the one type. The rows 41a and 41b are straight, and they are parallel to each other. The electrodes are perpendicularly aligned from row to row as illustrated by line 43, but this is not required. In FIG. 2B, the electrodes are offset from row to row. In FIG. 2C, row 45a has the electrodes staggered to facilitate close spacing, but the staggered array generally defines a straight line which is parallel to row 45b. In this case, the gap between electrodes in one row may not be the same as the gap in the other row, and there may be different gaps between unlike electrodes. When evaluating the like electrode gap versus the unlike electrode gap, the larger of the like electrode gaps should be compared to the smaller of the unlike electrode gaps to see if the close spacing criteria is met: (like gap) <50% (unlike gap). In this case, the larger of like gaps 47 and 49 is gap 47 and the smaller of unlike gaps 51 and 53 is gap 51.

Figure 2D:
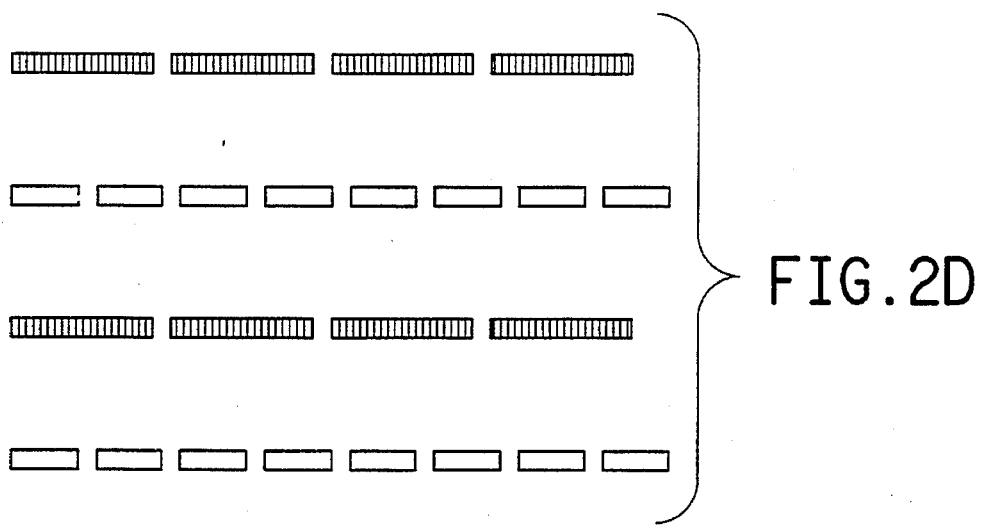
Figure 2E:
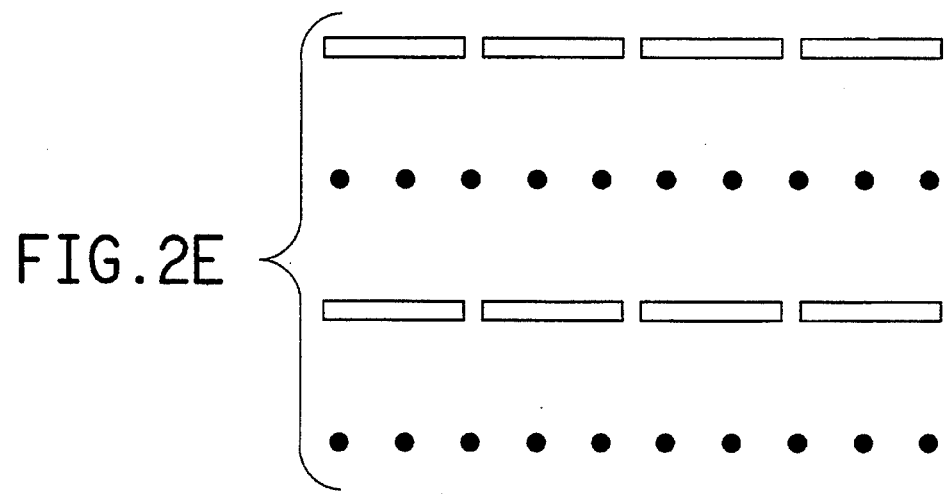
Figure 2F:
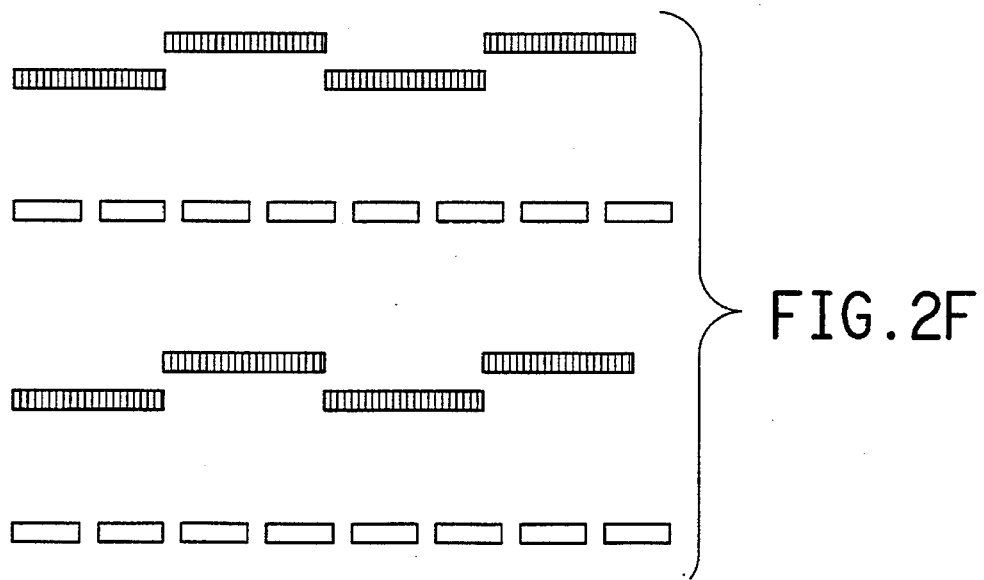
Figure 2G:
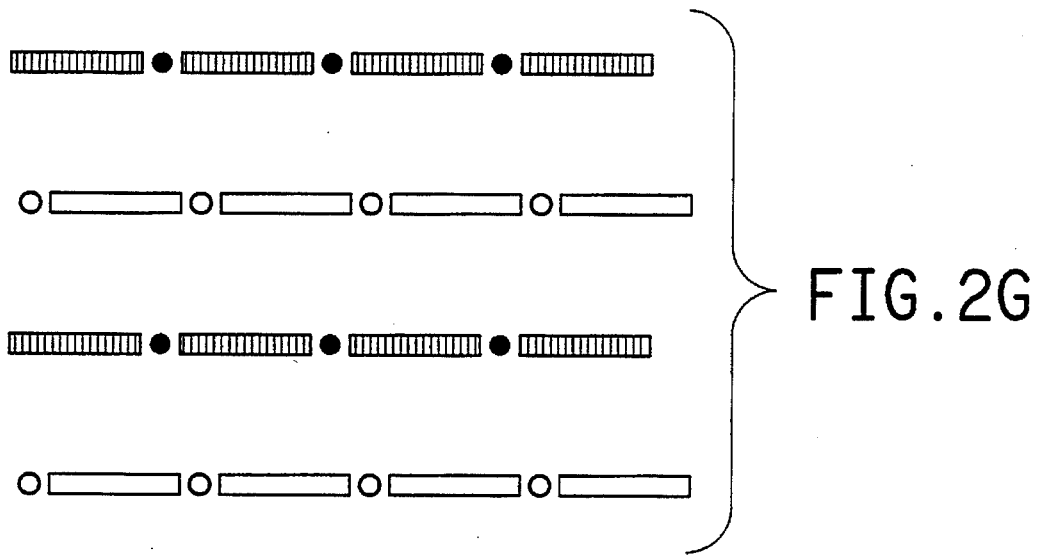
Figure 2H:
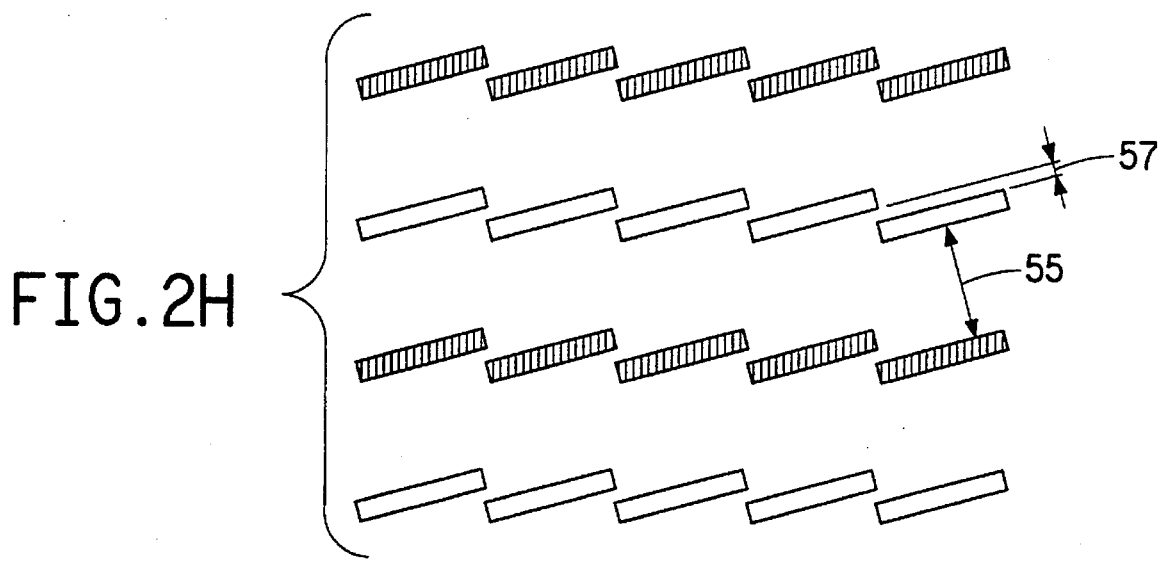

In FIG. 2D, an arrangement of a row of panel electrode assemblies is shown where the panels of one type of electrode are wider than the panels of the other type electrode, but the gaps between electrodes in the two rows are about the same. In FIG. 2E, rows of tubular electrodes are arranged with rows of panel electrodes which may be useful if tubular anodes and panel cathodes are the most economical combination for particular materials required for a specific contaminated soil. In FIG. 2F one row of panel electrodes may be staggered to effectively eliminate the electrical field gap between like electrodes in that row. In FIG. 2G, the gaps between panel electrodes are partially filled with tubular electrodes which may be easier to install at very close spacings. In FIG. 2H, the panel electrodes may be "shingled" to effectively eliminate the electrical field gap. In this case, the unlike gap would be the shorter perpendicular distance 55 between unlike electrodes and the like gap would be the distance 57, the largest gap between like electrodes.

When determining the gap distance between like electrodes in a row, the distance is between adjacent electrodes in that row. When determining the gap distance between unlike electrodes in adjacent rows, the distance is from one electrode in one row to the closest unlike electrode in the adjacent row. In the electrical field, the critical distances are between actual electrode surfaces, not electrode assemblies that may include other components. However, when arranging electrodes in actual contaminated soil regions, the dimensions of the electrode assemblies are generally much smaller than the distances between electrode assemblies so that for most practical purposes, the relevant gap distances can be measured between electrode assemblies rather than the actual electrode surfaces. For unusually close spacings of electrode assemblies, however, the actual distance to an electrode surface may need to be used as the gap distance when evaluating electrode arrangements.

Figure 3A:
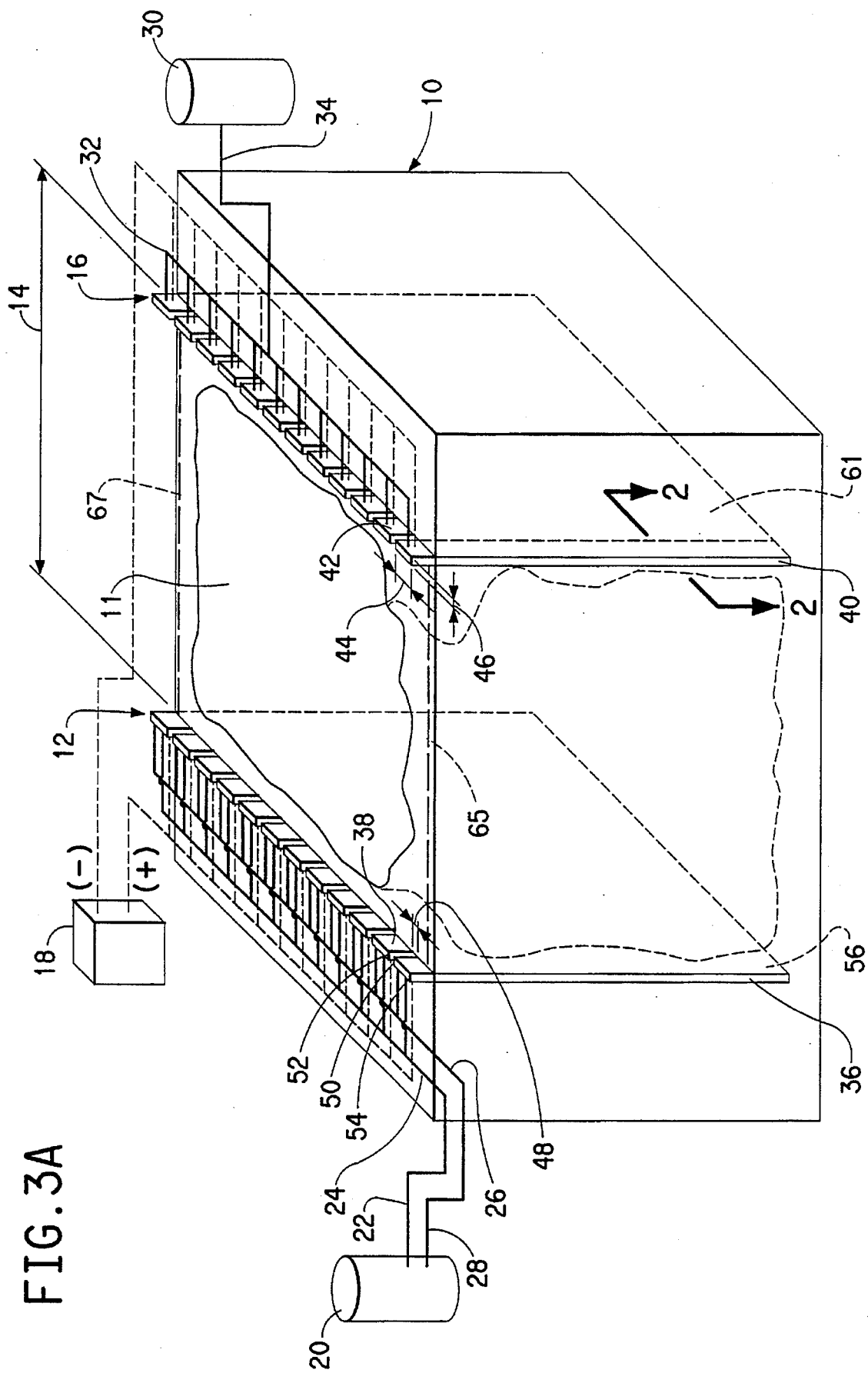
FIG. 3A is an isometric view of a section of a volume of soil showing rows of elongated anode and cathode panels.

FIG. 3A shows a cuboid volume of soil 10 with a contaminated volume 11. Adjacent the contaminated volume is a first row of electrode assemblies, such as source row 12 (that may be an anode row) that is uniformly spaced, such as by the substantially constant gap distance 14, from a second row of electrode assemblies, such as sink row 16 (that may be a cathode row). An electrical power supply 18 provides power to the rows of electrode assemblies. The electrical power supply 18 may be an AC to DC rectifier commonly used for cathodic protection systems with an output of 24 to 120 volts DC. Such a system may be obtained from Corrpro Companies, Inc. of West Chester, Pa. A purge fluid supply 20 provides a source of buffered solution to the row of sources 12 via a supply conduit 22 and supply manifold 24. A return manifold 26 and return conduit 28 provide a means to return fluid withdrawn from an electrode assembly to the supply 20. A pump may be part of the supply 20 to accomplish the fluid circulation. Returning a portion of the purge fluid accomplishes circulation of the fluid within the electrode panels and permits monitoring the composition of the fluid and treating the returned fluid with a fluid conditioning additive at the supply 20. Makeup water and buffering agents are added to supply 20 periodically as required to maintain a conditioned purge fluid available at the source row. An effluent reservoir 30 provides a container to collect effluent siphoned off the row of sinks 16 through manifold 32 and conduit 34. The effluent contains the contaminated water and purge fluid forced through the soil by electroosmotic forces, and the contaminant in the soil carried by the fluids. Periodically, the effluent would be removed and the contaminant neutralized or otherwise destroyed. In some cases, there may be a separate supply tank, a supply conduit, and supply manifold if it is desired to add fluid conditioner to the sink fluid. There may also be a return conduit to this supply tank if it is desired to condition the effluent during operation and before the effluent is removed for disposal.

Figure 3B:
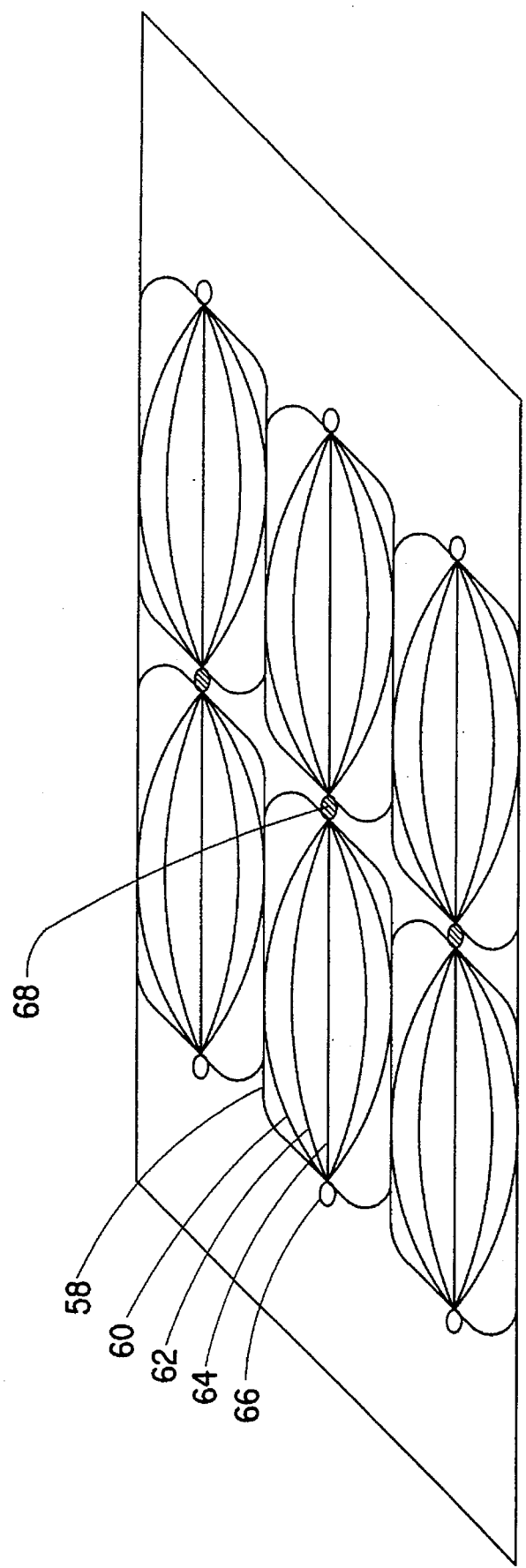
FIG. 3B is an isometric view of the top surface of the volume of soil of FIG. 3A showing an arrangement of tubular electrodes and the resulting non-uniform electric field.

The electrode rows are each made up of a plurality of electrode panels, such as anode panels 36 and 38 and cathode panels 40 and 42. These are both as long as the contaminated volume is deep which may typically be 15–20 feet to as much as 75–100 feet. They have a width 44 that is much greater than their thickness 46. The ratio of width to thickness is typically greater than 2× and preferably greater than 5×. They are closely spaced end-to-end at a distance 48 so that typically end 50 of panel 36 is spaced from end 52 of panel 38 at a distance less than 100% and preferably less than 25% of the width of panel 36 from end 50 to end 54. In this way, row 12 defines a planar surface 56 and row 16 defines a planar surface 61 that is at least 50% electrode panel and 50% space between panels and is preferably at least 75% electrode panel and less than 25% space between panels. This produces a uniform electric field between electrode row 12 and 16. By uniform electric field is meant a field that has a contaminant removal efficiency that has substantially better performance than the so-called two dimensional results discussed in the background above and approaches the so-called one dimensional results. It is believed that with the presence of such a uniform field only about 1.5 pore volumes of fluid needs to pass through the contaminated soil volume to remove about 90–100% of most aqueous phase organic contaminants. For comparison, FIG. 3B shows one conventional arrangement of tubular electrodes that could be used to treat the same contaminated volume of soil. A representation of a plan view of the nonuniform electric field is shown by the group of curved lines, such as 58, 60, 62, and 64 between tubular electrodes 66 and 68. These lines represent current paths of several different lengths. Note that for best efficiency for the conventional arrangement, another row of electrodes is added to the contaminated volume.

Referring to FIG. 3A, at each end of the electrode rows, there is a row of a plurality of elongated, impermeable, geomembrane panels, such as rows 65 and 67. Geomembrane row 65 extends from one end of electrode row 12 to the corresponding end of the opposed electrode row 16. Geomembrane row 67 extends between rows 12 and 16 at the other end of the rows. The purpose of the geomembrane rows is to provide an electrical insulating barrier to electric currents straying out from between the opposed electrode rows. The geomembrane panels are typically 1/16" thick HDPE elongated sheets inserted in the soil.

FIGS. 4A and 4B are typical section views of an electrode panel, such as section 2—2 of panel 40 from FIG. 3A. The elongated panel assembly has a width 44 and a thickness 46 that has a width to thickness ratio exceeding 2× and may typically be about 10× as shown in FIG. 4A.

In FIG. 4A, the panel has an elongated electrode material layer 74 having a width extending substantially across the width 44 of the panel. The panel assembly has one exposed end extending out of the soil and the other buried end opposite the one end which extends to the lower reaches of the contaminated region of the soil. There is a channel layer 72 having an elongated perforated core 83 containing an elongated fluid circulation channel 73 adjacent one side of the electrode layer for circulating fluids from the one end to the other opposite end of the panel assembly. The channel contains a plurality of standoffs, such as standoff 81, for resisting collapse by soil pressure forces. There is a permeable layer 75 for passing fluid to and from the channel 73 while retarding the flow of soil into the channel. The permeable layer may be adhesively attached to the channel layer or it may be part of a permeable covering 80 snuggly enclosing all sides and the buried end of the elongated panel assembly that acts to hold at least the channel layer and permeable layer together as a laminate structure, and in fact may hold all the layers together. The assembly may also include a conduit 78 disposed at the one exposed end and along a portion of the length of the elongated panel assembly for directing fluid to or from the panel assembly. The conduit 78 may typically extend to the top of the contaminated region when the panel is in the soil. The assembly may also include a second conduit 80 disposed at the one exposed end and along the entire length of the elongated panel assembly for directing fluid from the one exposed end to the opposite buried end of the panel assembly. This conduit 80 may be used to direct fluids to the bottom end of the assembly, which fluids can then be circulated upwards through channel 73 until they reach the top of the contaminated region and be withdrawn from the exposed end of the assembly through conduit 78. The conduit 80 may have orifices (not shown) along its length to supply fluid to the panel intermediate the upper and lower ends. In a simple electroosmosis application, the anode and cathode panels may not need any conduits within the assembly, since the fluid can be supplied and withdrawn from the top of the assembly.

In some cases the electrode assembly is used in a bidirectional arrangement where both sides of the electrode are active, i.e., facing unlike electrodes, such as the electrode row 31 in FIG. 1B. The bidirectional assembly may include a second channel layer 76 having an elongated perforated core 85 containing a second elongated fluid circulation channel 77 adjacent another side of the electrode layer 74 for circulating fluids from the one end to the opposite end of the panel assembly on the other active side of the electrode. In this case, the electrode 74 may beneficially be a perforated electrode so fluid directed into channel 73 may also circulate to channel 77 through the electrode. A second permeable layer 79, similar to layer 75, is adjacent layer 76 for passing fluid to and from the second channel 77 while retarding the flow of soil into the second channel.

In some cases the electrode assembly is used in a unidirectional arrangement with only one active side, such as the electrode row 27 in FIG. 1B, and the assembly may include an impermeable geomembrane layer 84 adjacent one side of the electrode material layer to thereby limit electrical current flow in that direciton. In this case, the layer 76 may not be needed. The current and fluid flow would be directed as depicted by arrow 86.

Difficulties can be encountered during operation of the electrodes due to the generation of hydrogen ions at the anode and hydroxide ions at the cathode. Unless neutralized, the hydrogen ions generated at the anode will migrate into the soil, toward the cathode. The resulting low pH of the soil in the vicinity of the anode lowers the electroosmotic permeability of the soil, meaning that a higher applied electrical potential is required to induce the desired rate of water flow. This consumes more electrical power. Meanwhile, unless the hydroxide ions generated at the cathode are neutralized, they will migrate into the soil, toward the anode. The resulting high pH of the soil in the vicinity of the cathode can cause many contaminant species, such as heavy metals, to precipitate, thereby impeding their remvoal from the soil. Additional problems may arise when a contaminant's state of electrical charge changes with pH such that it will be in one state in the low-pH soil near the anode and another state in the high-pH soil near the cathode. Since the charge state determines which direction a species will migrate due to an electric field, an effective means of remediating soil by electroosmosis or electromigration may not be possible if the contaminant is not in the same charge state throughout the soil.

The present invention addresses problems related to soil pH by providing a means of controlling the pH of the fluid surrounding the electrodes, if desired, thereby preventing acidic or basic fronts moving through the soil. This can be accomplished by positioning the electrode material within the assembly so there is always a channel between the electrode and the soil. By passing a buffered solution within this channel, the hydrogen ion produced at the anode or the hydroxide ion produced at the cathode will be neutralized without having migrated into the soil. It has been found that the ion production rate is higher than the electroosmotic flow rate so good circulation of fluid in the channel is required to keep the fluid between the electrode material and the soil neutralized. By utilizing conduits 78 and 80, good circulation of fluid along the length of the assembly can be achieved. For instance, the flow rate of fluid from the source electrode assembly through the return and supply conduits may be 20× to 80× greater than the electroosmotic flow also going through the supply conduit. The supply tank 20 would have a fluid conditioning additive in the tank, such as lime, that dissolves slowly over time to keep the pH initially above neutral. As the pH level approaches neutral, more lime would be added to the tank. A stirrer in the bottom of the tank would keep the lime suspended and the solution in the tank at a uniform pH. It is desirable to circulate the fluid at such a rate that the pH level in the return conduit 28 does not differ from the pH level in the supply conduit 22 by more than about 0.1 to 0.2 pH units due to the electrochemical reaction in the electrode assembly. Without such circulation in the electrode assembly there may be significant pH variations along the length of the electrode that would decrease the efficiency of the electroosomosis process by decreasing the electroosmotic flow rate at the voltage used.

The conduits 78 and 80 are shown disposed within the channel layer 72 which is thick enough to allow for a large diameter for the conduits. Alternatively, layer 72 could be thinner and the same size conduits located at the ends of the panel, such as shown in dashed lines at 82, where the overall panel thickness is also shown thinner. This would result in a slight increase in the panel width 44 without an increase in the width of the electrode 74, but the effect of such a change in the operation of the electrode assembly is considered minor.

The purge fluid can be buffered by adding a base material such as NaOH or lime. NaOH produces the least reduction in flow rate compared to lime, but it also was found to produce about 20% soil swelling adjacent the anode which is perceived as a problem. A mixture of 10% or 20% NaOH and 90% or 80% lime by volume produces a buffer additive that keeps the flow rate substantially constant and does not produce noticeable soil swelling. The conduits and fluid circulation channel in the assembly can also be usefully employed to introduce other fluid conditioning additives besides buffers to the assembly. These may include complexing agents, surfactants, pH modifiers and the like.

A variety of materials may be used for the components of the electrode panel. The layers 72 and 76, for instance, may be devices known as Hydraway Drains manufactured by the Monsanto Chemical Company in St. Louis, Mo. The layer 76 could be a Model 100 drain and layer 72 a Model 2000 drain. A model 2000 drain consists of a polyethylene molded core that is encapsulated with a polypropylene filter fabric that is fusion bonded to the core. Typical open areas for passing water are 40–60%. The core is typically a molded sheet with a plurality of standoffs molded to one side of the sheet. The sheet is perforated throughout its surface. The geotextile filter fabric is wrapped completely around the core, lap joined to itself, bonded to the standoffs, and selectively bonded to the surface opposite the standoffs.

Other channel structures may be used, such as a sheet with upstanding ribs molded on one side, and another sheet attached to the top edge of the ribs. Both sheets would be perforated. The channel structure is essentially an elongated tube structure with perforated sides that can be made a variety of ways. The electrode used as a source, such as the anode, may be an expanded metal made of titanium that has a coating that includes iridium oxide. Such an anode material may be obtained from Elgard Corporation of Chardon, Ohio. The electrode used as a sink, such as the cathode, may be an expanded metal or a wire mesh made of steel that may be galvanized to resist corrosion; or it may simply be a solid steel plate about ¼" thick if weight is not a concern as may be the case for narrow short panels or when the panels do not need to be handled manually. The geomembrane may be a sheet of ⅟₁₆" thick HDPE. The geotextile may be a spun-bonded polyethylene fabric about 0.1–0.2" thick with at least a 50% open area. The conduits may be polypropylene tubing or pipe.

FIG. 4B shows an alternative embodiment for the electrode panel where the electrode 74' is a solid metal sheet to which the Hydraway Drains used as layers 76' and 72' can be easily attached with adhesive. If additional filtering is required for the particular soil involved or additional strength to resist soil pressure is desired, a piece of geotextile 90 may be adhesively attached to layer 72'. If a current insulator is required, geomembrane 84' can be adhesively attached to layer 76' which can also act to block infiltration of soil through layer 76'. If the panel is to be used as a sink electrode, only one conduit 78' may be required. Item 92 is a mandrel (to be discussed later) that is temporarily used to insert the panel in the soil, so the panel must fit loosely in the mandrel as shown.

The panels can be inserted into the soil while leaving the soil in-situ, that is, without excavating soil, by forcing a hollow mandrel into the soil, placing the panel in the mandrel, and removing the mandrel while leaving the panel behind. The soil may then collapse back around the panel. The only soil removed is that which may stick to the mandrel upon removal and this can be minimized by scraping the mandrel at the soil surface as the mandrel is withdrawn. FIG. 5 shows an elevation view of an excavator 94 that has a three-sided mast 96 attached to its boom 98. This view is looking into the open side of the mast where there is suspended a vibratory hammer 100. Below the hammer and gripped by it is a mandrel 92 which has a shoe 102 on its lower end. There are rafts (not shown) on the mast for guiding the mandrel. A motor driven shaft 104 with sprockets 106 and 108 drive chain loops 110 and 112, respectively, that raise and lower the hammer 100 and attached mandrel 92. In operation, the mast is located where it is desired to place the next electrode panel and the mast is pressed against the soil by the excavator and tilted until it is vertical within about 1 degree. An excavator useful for this purpose is a model 235C made by the Caterpillar Co. of Peoria, Ohio. The mandrel is secured to the raised hammer using clamps furnished with the hammer. A hammer useful for this purpose is a model 150 furnished by American Piledriving Equipment Inc., of Kent, Wash. A shoe is held in place on the mandrel as it is lowered to the surface of the soil. The shoe is preferably a pair of angled plates with a 60 degree included angle with a cross brace at each end to engage the end of the mandrel and resist spreading of the plates. The mandrel has pointed ends that match the 60 degree angle of the shoe and that fit outside the braces. The driven shaft 104 rotates to drive the chain loops to lower the hammer and mandrel and force them into the soil. The vibratory hammer is energized to drive the mandrel and shoe through the soil until the proper depth is reached which depends on the depth of the contamination in the soil. The hammer is then released from the mandrel and raised by the driven shaft and chain loops. The electrode panel is then placed in the open end of the mandrel by hand or the hammer can grip the panel and be used to lower it into the mandrel. Alternatively, the panel may be inserted into the mandrel before it is driven into the soil. After the panel is in the mandrel, the hammer is lowered and reengages the mandrel. The driven shaft and chain loops then pull the mandrel from the soil leaving the panel in place. Soil scraped off the mandrel as it is withdrawn may fall back into the space left between the mandrel and the panel in the soil.

Figure 6:
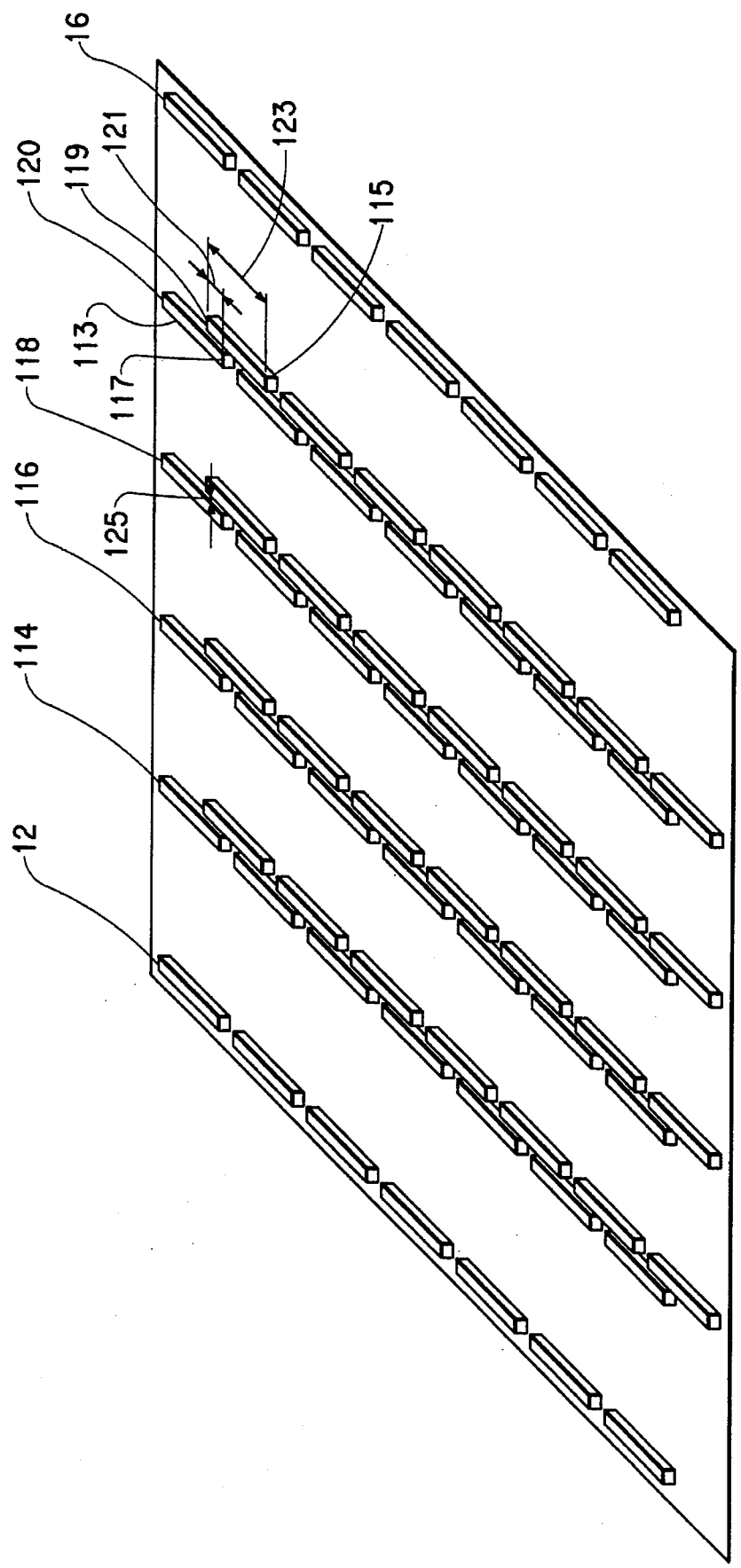
FIG. 6 is an isometric view of rows of electrode panels and treatment panels.

FIG. 6 shows another way to handle the contaminants in the soil by special treatment as the fluid flows from the source 12 to the sink 16 electrode rows of FIG. 3A. Only the electrode rows 12 and 16, and treatment rows 114, 116, 118, and 120 are shown to illustrate this embodiment. The treatment rows comprise a plurality of treatment panels that are arranged to be overlapped and staggered in a way that forces all the fluid to travel through the treatment panels rather than the tortuous path around them as the fluid flows from electrode row 12 to electrode row 16. This is accomplished by placing a first treatment panel, such as panel 113 adjacent a second treatment panel, such as panel 115 with one end 117 of the first panel overlapping and staggered relative to the adjacent end 119 of the second treatment panel, with the overlap distance 121 being less than 25% of the width 123 between ends of a panel and the ratio of the overlap 121 to the stagger gap 125 being greater than 0.3.

Within the panels would be a treatment media such as a flowable solid that can be added to the panel after it is inserted in the soil. The treatment media will ordinarily remain within the panel during the treatment process. For treating halogenated organics, the media may be iron filings, or iron filings that are mixed with activated carbon as taught in the above referenced '087 British publication. For other contaminants, the media may be a mixture of sand, activated carbon and nutrients that support microorganisms that digest the contaminants. Other forms of biological treatment may also be possible. The treatments may be accelerated by the introduction of oxygen, air, other gases or other fluids so conduits may be provided in the panels similar to the conduits discussed in reference to the electrode panels. The treatment panels can be inserted in the soil the same as the electrode panels. Preferably, the treatment media would be added to the panel before the mandrel is withdrawn to eliminate soil pressure defomration of the panel that may inhibit free flow of the media and decrease the quantity of media that can be added.

FIGS. 7A and 7B show two embodiments of treatment panels. In FIG. 7A, the treatment panel consists of a channel layer 122 that contains a perforated elongated channel 124, for holding a flowable treatment media; a first geotextile filter layer 128 and a second geotextile filter layer 130 that keeps soil particles from plugging the treatment media and retards flowing of the flowable treatment media out of the channel. The channel contains a plurality of standoffs, such as standoff 126, for resisting collapse by soil pressure forces. The layer 122 can be the same Hydraway Drain device as the layer 72 in the electrode panel of FIG. 4A, and the geotextile may be the same as layer 90 in the panel of FIG. 4B. Conduit 132 is disposed along the length of the elongated treatment panel to direct fluids from one end of the panel to the other to add fluids to the treatment media as required; it may have orifices along its length. The treatment panel assembly has a width to thickness ratio greater than 2×.

FIG. 7B shows an alternative treatment panel that features a first portion of panel 134 and a second portion of panel 136 that is a removable portion. Portion 134 is the same as the panel in FIG. 7A. The removable portion includes a container 138 comprising a perforated chamber 140 enclosed in an elongated geotextile sleeve 142, closed off at the lower end, for passing fluid to or from the interior of the container while retarding the flow of soil into the container. Within the container is a panel portion 143 that comprises an elongated perforated core 141 containing a channel 145, and a permeable geotextile 147 surrounding the core and enclosing one end for passing fluid to and from the channel while retarding the flow of soil into the channel and retarding the flow of treatment media out of the channel. The core may include standoffs, such as 139, to stiffen the core to resist handling damage. The panel portion 143 may be made from the same type of Hydraway drain as was used in layer 72 of the electrode assembly of FIG. 4A. The channel 145 is filled with a flowable treatment media (not shown) that may be poured or blown or injected into the channel. The panel portion 143 slideably fits inside the container 138 so that it can be inserted and removed from the container after the container has been placed into the soil. This removable portion can be used for sampling the effectiveness of the treatment row by withdrawing panel portion 143 from the container and inspecting it, or the treatment media in portion 143 may be altered or rejuvenated or replaced. The removable portion has a width to thickness ratio greater than 2×. In another embodiment, the removable portion could extend the entire width of the panel so the entire treatment portion could be removed and replaced if needed. The dashed line 144 in FIG. 7B represents the inside perimeter of the mandrel 92 to show how the portions of the treatment panel fit loosely therein. The separate portions 134 and 136 of the panel may be free-standing as shown or it may be desired to hold the two portions of the panel of FIG. 7B together by using the technique of FIG. 4A, or by using large tie-wraps or straps that could be wrapped around the two portions at intervals along their length.

Figure 8:
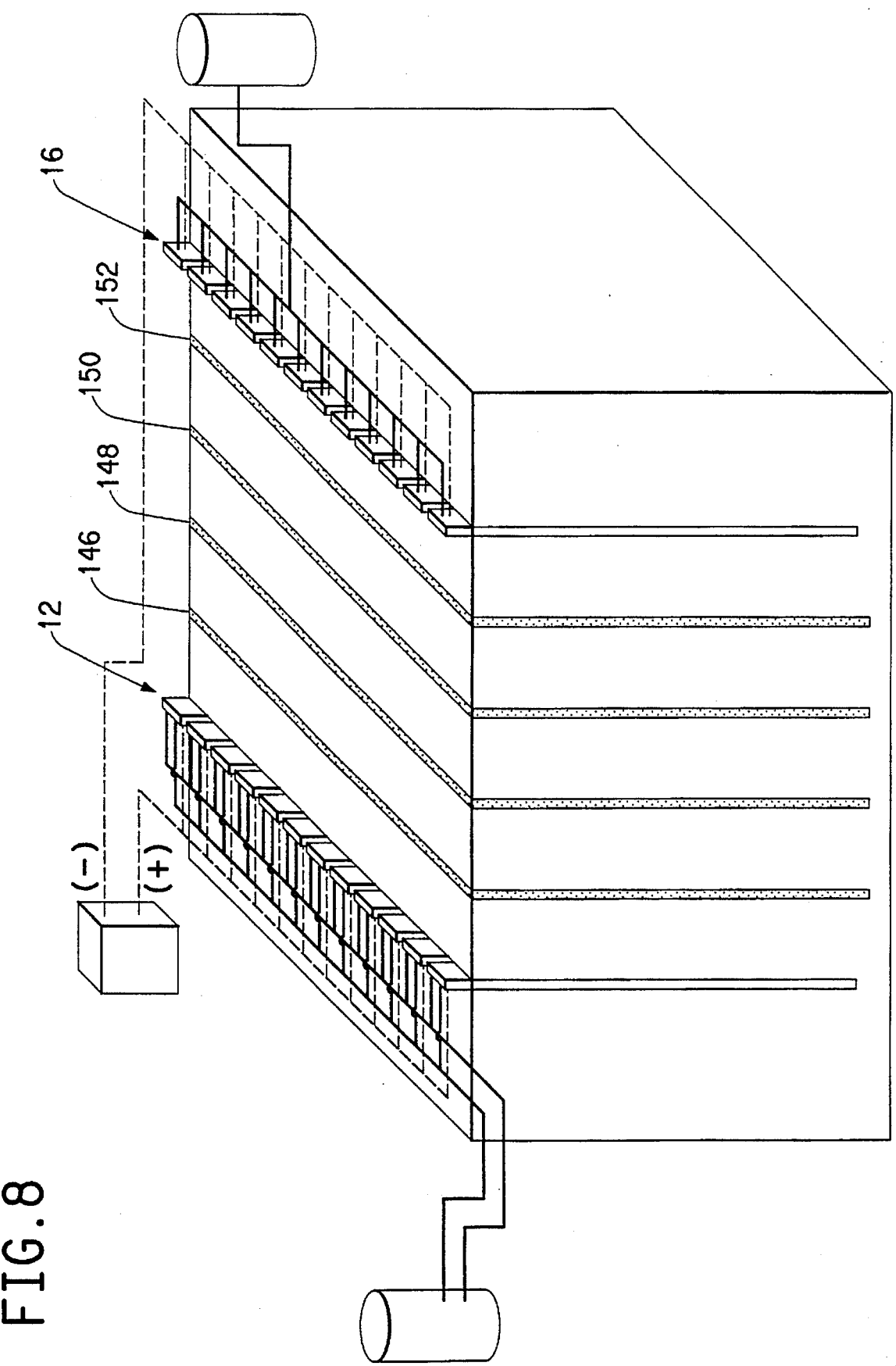
FIG. 8 is an isometric view of a section of a volume of soil showing rows of electrode panels and treatment walls.

FIG. 8 shows another embodiment for treating the fluid between the electrode rows. In this case, treatment panels are not used and instead, treatment walls 146, 148, 150 and 152 of a flowable treatment medium are constructed between electrode rows 12 and 16. These can be constructed by using a pair of mandrels that are alternately inserted adjacent to and abutted with one another. The mandrels may have mating ribs and slots so the mandrels are linked together as are conventional dam walls that are sometimes used to positively retain soil or fluids in a volume of soil. A trench can be progressively formed in the soil while leaving the soil in-situ by forcing a first mandrel into the soil; placing a second mandrel into the soil and with a first end abutted with the first mandrel; placing the flowable treatment medium into the first mandrel; removing the first mandrel and leaving the flowable medium in place; placing the first mandrel into the soil and abutting the first mandrel with a second end of the second mandrel; placing the flowable treatment medium in the second mandrel; removing the second mandrel; and; repeating the steps with the mandrel until the planar treatment wall extends for the length of the electrode rows. Such a technique may also be used to form an electrode wall as an alternative to trenching as taught in the above referenced '842 Japanese patent publication.

When treatment panels or treatment walls are used between the electrode assemblies, the effluent withdrawn from the sink electrode assemblies may be relatively free of contaminant as a result of the treatment. It is feasible to take the effluent fluid from the sink electrode assemblies, provide some simple treatment if necessary, and use it as the supply fluid for the source electrode assembly. This would conserve fluid and would eliminate a possible problem in disposing of a large quantity of effluent fluid. Alternatively or additionally, when using treatment panels or walls, it may be desirable to alternate the source and sink electrodes by periodically reversing the polarity of the electrical power applied to the electrode assemblies. This would reverse the electroosmotic flow through the treatment panels and the sink fluid would become the source fluid and vice-versa. In this case, the electrode materials in the two types of electrode assemblies would have to function equally well as anodes or cathodes. The ¼" thick electrode plate in the embodiment of FIG. 4B would work well for both electrodes in this case.

Figure 9:
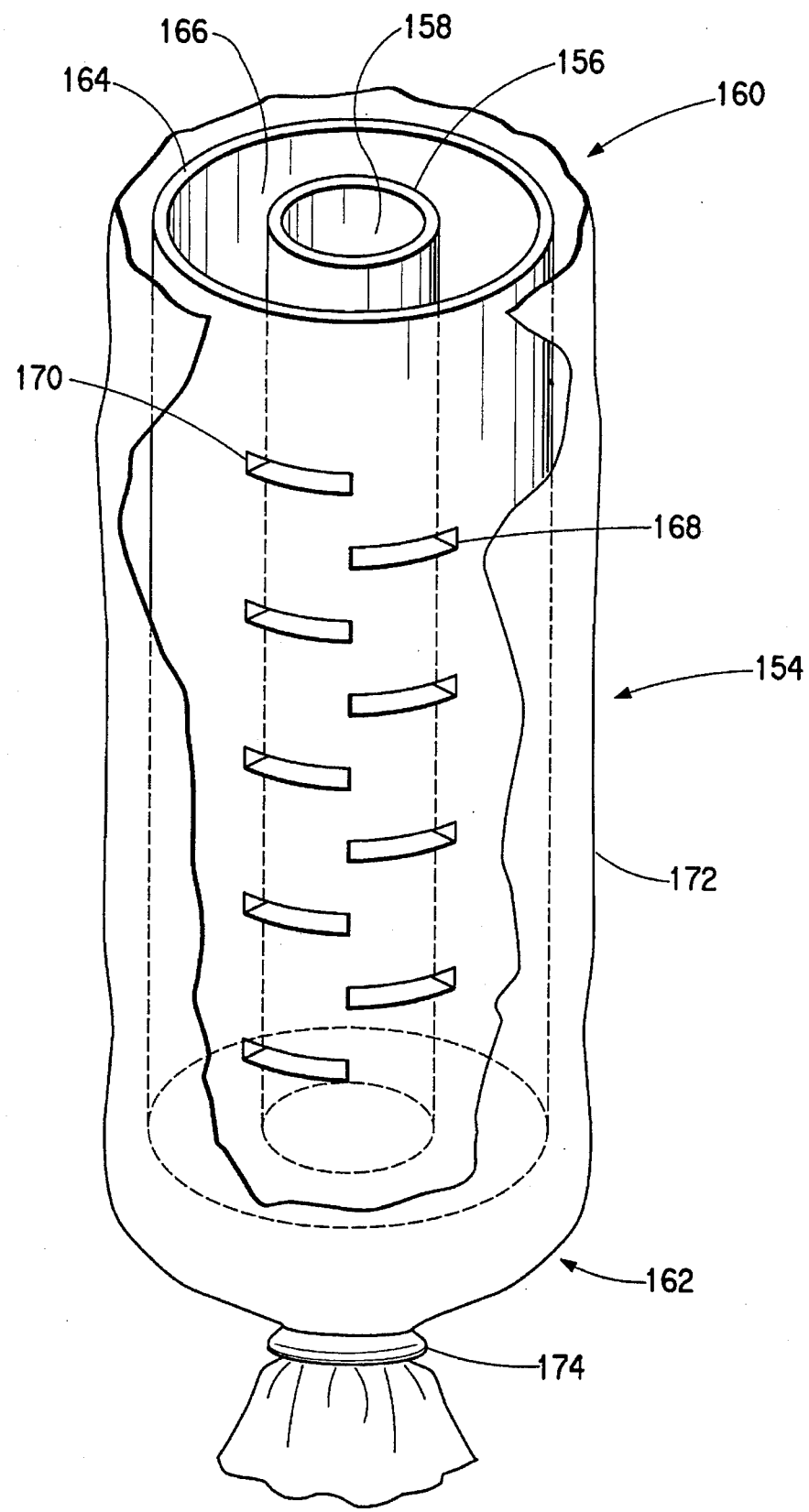
FIG. 9 is a cut away view of a tubular electrode assembly.

FIG. 9 shows a tubular electrode assembly 154 useful in removing contaminants from soil by electrokinetics. The electrode assembly comprises an elongated tubular electrode 156 that has a bore 158 for directing fluid from one end 160 to the opposite end 162 of the electrode assembly 154. The assembly further comprises an elongated perforated tube 164 surrounding file electrode 156, the tube having a channel 166 for circulating fluid from the one end 160 to the opposite end 162 of the assembly. The tube 164 has a plurality of perforations along its length, such as slots 168 and 170 for passing fluid to and from the channel 166. The assembly further comprises a permeable covering 172 surrounding the tube and the end 162 to pass fluid to and from the channel 166 while retarding flow of soil into the channel. The electrode 156 may be attached to the wall of the tube 164 to hold it axially secure and radially secure, or, as shown, the electrode may not be radially secured and may be axially secured only by the closed end 174 of the permeable covering. The permeable covering 172 preferably is snuggly engaged with the outer diameter of tube 164. The electrode material may be any common electrode material but is preferably a thin walled titanium tube having a coating on the outside that includes iridium oxide. The perforated tube 164 may be a PVC tube or a web-like tube of polymer that will resist the soil forces and support the permeable covering without substantially interfering with the electric field. The permeable coverting material is similar to that used with the panel electrode assembly.

Although the invention has been discussed in the context of inserting various panels vertically into soil in-situ, it is within the scope of the invention to use the panels horizontally or at some other angle. The soil may also be excavated and piled up and the panels inserted in the pile. For instance, one row of sink electrode assemblies may be placed on a horizontal surface, the soil may be piled on top of the assemblies to the desired treatment depth, and a second row of source electrode assemblies placed on top of the soil pile with a capping layer of soil placed on top of the second assemblies. Impermeable walls may be placed around the pile. Fluid would be added to the source assemblies and pass through the soil by electroosmosis aided by gravity and be withdrawn at the sink assemblies.

The inventive system of using closely spaced like electrodes and using panel electrode assemblies to achieve the optimum close spacing and using emplacement techniques while leaving the soil in-situ may offer a system cost savings over the conventional use of equidistance spaced electrodes, the use of only tubular electrodes, and excavation techniques for electrode emplacement. In the comparison, since not much was known about conventional buffer additive systems, the conventional case was given the benefit in the analysis of the buffer recirculation system of the invention. The major differences in the systems are summarized in the electrode spacing that affects the uniformity of the electric field that affects the pore volumes of fluid required to remove the contaminant to an acceptable level. The economics of the electrode spacing can be appreciated by considering the anode to cathode spacing. The two major costs that are affected by the anode-cathode spacing are electricity consumed and the electrode system cost (cost per electrode, numbers of electrodes required and installation cost per electrode). The electricity cost is affected because for a given remediation time, the anode-cathode spacing will determine the magnitude of the applied potential required to accomplishment the decontamination project. The electrode system cost is affected because the number of electrodes varies inversely with the anode-cathode spacing. There is an optimum spacing for each project where the reduced cost of power at a close spacing is offset by the costs of addition electrodes in the system. Other costs are considered equivalent for the two systems, although the amount of effluent treated for the conventional system that must pass more pore volumes for cleanup may produce a signficant difference in effluent treatment costs. It is estimated that a conventional well electrode system will cost $20 to $30 more per cubic meter of soil decontaminated than the system of the invention. Since it is suspected that the conventional buffer additive system is inferior to the recirculation system of the invention, these numbers are considered conservative.

EXAMPLE 1

A laboratory test was run to demonstrate the value of circulating a treated fluid between the electrode and the soil. Contaminated soil of low hydraulic permeability (less than 1 E-4 cm/sec) was placed in a 6" wide, 18" long acrylic plastic box, to a height of about 3.5". The contaminant was HMPA and the sample came from an actual site. The soil moisture content was about 0.36 (vol/vol), and the total fluid content was about 2,000 mL. The soil was comprised of about 40% clay, 30% silt and 30% sand. A cathode was constructed of galvanized chicken wire and was placed at one end of the box, spanning the width of the box. It was hooked to the negative terminal of a DC power supply. Between the cathode and the soil was a panel comprised of a perforated plastic channel core surrounded with permeable geotextile to pass fluid to and from the channel while retarding flow of soil into the channel. An anode was constructed of titanium expanded metal mesh coated with a mixed metal oxide containing iridium oxide. The anode was placed t the opposite end of the box, spanning the width of the box and sandwiched between two of the panels above such that the electrode material would be bathed on all sides by the fluid during operation. The anode mesh was connected to the positive terminal of the DC power supply. A constant 40 mA of current was driven through the electrodes and soil sample.

Clean water with a mixture of 10% sodium hydroxide and 90% calcium oxide (lime) was circulated from an external beaker to the bottom of the anode panels, then siphoned off from near the top of the panel and returned to the beaker. The flow of fluid to and from the anode was about 5–20 mL/min. Contaminated effluent was collected from the cathode panel by a separate pump. The rate of effluent fluid flow averaged about 200 mL per day. The fluid levels in the electrode panels is kept the same, providing negligible hydraulic driving force for the fluid flow. The flow of effluent out of the soil is caused by electroosmosis.

The time to collect about 1.5 pore volumes of effluent (about 3,000 mL) was noted. This reduced the MPA concentration from about 50 ppm to a level that was undetectable by the GC/MS detection method good to about 0.5 ppm. The time to collect the 1.5 pore volumes was about 14 days.

EXAMPLE 2

The experiment of Example 1 was repeated with the following changes:

the fluid directed to the anode panel from the beaker was clean water;

the fluid at the electrode was maintained at a constant level using a level probe, and no fluid was siphoned off at the anode and returned to the beaker;

the electroosmotic flow rate varied starting at about 200 mL per day and ending at about 100 mL per day.

The time to collect 1.5 pore volumes of effluent at the cathode was 23 days, over 60% more time than required using a treated fluid circulated between the anode and the soil.

What is claimed is:

1. A method of decontaminating a volume of soil using an electric field comprising the steps of:

arranging a first plurality of elongated electrode assemblies in said volume in rows of source electrode assemblies at a closely spaced like-electrode gap distance to approximate a planar source electrode;

arranging a second plurality of elongated electrode assemblies in said volume in rows of sink electrode assemblies at a closely spaced like-electrode gap distance to approximate a planar sink electrode;

arranging the first plurality of source electrodes spaced at an unlike-electrode gap distance from the second plurality of sink electrodes wherein the like-electrode gap distance between sink electrodes wherein the like-electrode gap distance between like electrode assemblies within a row is less than 50% of the unlike-electrode gap distance between unlike electrode assemblies from row to row;

applying an electrical potential difference between the source electrodes;

directing a first fluid with a fluid conditioning additive to the source electrode assemblies;

electro-osmotically urging a first portion of said fluid from the source electrode toward the sink electrode;

circulating a second remaining portion of said first fluid along the length of each source electrode assembly, from one end to the opposite end of each of the electrodes of the source electrode assemblies and at a flow rate which is greater than the flow rate of the electroosmotically urged first portion of fluid;

withdrawing the second portion of said first fluid from the source electrode assemblies.

2. The method of claim 1 further comprising the steps of:

directing a second fluid with a fluid conditioning additive to the sink electrode assemblies;

receiving at the sink electrode said electro-osmotic urged first portion of said first fluid from the source electrode;

circulating said second fluid along the length of the sink electrode assemblies from one end to the opposite end of each of the electrodes of the sink electrode assembly;

withdrawing the second fluid and the electroosmotically urged first portion of said first fluid from the sink electrode assemblies.

3. The method of claim 1 further comprising the steps of:

treating the withdrawn fluid, and redirecting the treated fluid to the source electrode assemblies.

4. The method of claim 1 further comprising the step of:

inserting the electrodes in the soil while leaving the soil in-situ.

5. The method of claim 4, wherein the inserting step comprises steps of:

forcing a mandrel into the soil;

placing the electrode assembly within the mandrel, and;

removing the mandrel and leaving the electrode assembly behind in the soil.

6. The method of claim 1, further comprising the steps of:

arranging a plurality of elongated treatment panels in a row spaced between the row of first electrode assemblies and the row of second electrode assemblies, the treatment panels each staggered and overlapped with adjacent treatment panels.

7. The method of claim 6, wherein the arranging step includes the steps of:

placing a first treatment panel adjacent a second treatment panel with one end of the first panel overlapping and staggered relative to the adjacent end of a second treatment panel, with the overlap distance being less than 25% of the width between ends of a panel and the ratio of the overlap to the stagger being greater than 0.3.

8. The method of claim 1, further comprising the steps of:

establishing a planar treatment wall spaced between the row of first electrode assemblies and the row of second electrode assemblies by placing a flowable treatment medium in the soil.

9. A method of decontaminating a volume of soil using an electric field comprising the steps of:

arranging a plurality of electrode assemblies in rows of first source electrode assemblies spaced apart from rows of second sink electrode assemblies, wherein the gap distance between like electrode assemblies within a row is less than 50% of the gap distance between like electrode assemblies from row to row;

applying an electrical potential difference between the first electrodes and second electrodes;

supplying fluid to the source electrode assemblies and removing fluid from the sink electrode assemblies; and establishing a planar treatment wall spaced between the row of first electrode assemblies and the row of second electrode assemblies by placing a flowable treatment medium in the soil wherein establishing a planar treatment wall further comprises the steps of:

forcing a first mandrel into the soil while leaving the soil in-situ;

placing a second mandrel into the soil while leaving the soil in-situ and with a first end of the second mandrel abutted with the first mandrel;

placing the flowable treatment medium into the first mandrel;

removing the first mandrel and leaving the flowable treatment medium in place;

placing the first mandrel into the soil while leaving the soil in-situ and abutting the first mandrel with a second end of the second mandrel;

placing the flowable treatment medium into the second mandrel;

removing the second mandrel and leaving the flowable treatment medium in place, and;

repeating the steps with the mandrels until the planar treatment wall extends for the length of the rows of electrodes.

10. A method of decontaminating a volume of soil using an electric field comprising the steps of:

arranging a plurality of electrode assemblies in rows of first source electrode assemblies spaced apart from rows of second sink electrode assemblies, wherein the gap distance between like electrode assemblies within a row is less than 50% of the gap distance between like electrode assemblies from row to row;

applying an electrical potential difference between the first electrodes and second electrodes;

supplying fluid to the source electrode assemblies and removing fluid from the sink electrode assemblies; and placing a row of impermeable geomembranes extending from one end of the row of first electrode assemblies to the corresponding end of the row of second electrode assemblies to thereby provide an electrical insulating barrier to electric currents straying from between the rows of electrodes.

11. An electrode assembly useful for removing contaminants from soil by electrokinetics, comprising:

an elongated rectangular panel electrode assembly having a greater width than its thickness, the panel comprising;

an elongated planar electrode material layer having a width extending substantially across the entire width of the panel;

an elongated tubular rectangular structure with perforated sides held against said planar electrode, the tubular rectangular structure containing a fluid circulation channel, along the length of the electrode;

a permeable fabric around said channel for passing fluid to and from the channel while retarding the flow of soil into the channel;

means to hold at least the electrode, tubular structure and permeable fabric together as a laminate structure.

12. The assembly of claim 11 further comprising a conduit disposed at one end and along a portion of the length of the elongated panel assembly for directing fluid to or from the panel assembly.

13. The assembly of claim 12, further comprising a second conduit disposed at the one end and along the length of the elongated panel assembly for directing fluid from the one end to the opposite end of the panel assembly.

14. The assembly of claim 13, wherein the second conduit is disposed within the channel layer.

15. The assembly of claim 11 wherein the means to hold the layers together comprises a permeable covering enclosing all sides and the end opposite said one end of the elongated panel assembly.

16. The assembly of claim 15 wherein the electrode material is titanium having a coating containing iridium oxide.

17. The assembly of claim 11, further comprising a second channel layer having a second elongated, perforated core containing a fluid circulation channel, the second channel layer adjacent another side of the electrode layer;

a second permeable layer for passing fluid to and from the second channel while retarding the flow of soil into the second channel, means to hold at least the second channel layer and second permeable layer together as a laminate structure.

18. The assembly of claim 11, wherein the electrode material layer is an expanded metal mesh.

19. An electrode assembly useful in removing contaminants from soil by electrokinetics, comprising:

an elongated panel assembly having a width to thickness ratio greater than 2:1, the panel comprising;

an elongated electrode material layer having a width extending substantially across the width of the panel;

a channel layer having an elongated, perforated core containing a fluid circulation channel, the channel layer adjacent one side of the electrode layer;

a permeable layer for passing fluid to and from the channel while retarding the flow of soil into the channel;

means to hold at least the channel layer and permeable layer together as a laminate structure and further comprising an impermeable geomembrane layer adjacent one side of the electrode material layer to thereby limit electrical current flow in that direction.

20. An elongated electrode assembly useful in removing contaminants from soil by electrokinetics, comprising:

an elongated tubular electrode having a bore for directing fluid from one end to the opposite end of the assembly;

an elongated tube surrounding the tubular electrode, the tube having a fluid circulation channel for circulating fluid from one end to the opposite end of the assembly, and the tube having perforations along its length for passing fluid to and from the channel;

a permeable layer surrounding the elongated tube and its said opposite end for passing fluid to and from the channel while retarding the flow of soil into the channel;

means to hold the electrode within the tube.

21. A method of decontaminating soil using an electric field comprising the steps of:

arranging a plurality of rectangular electrode panel assemblies according to claim 12 in rows of first source electrode panel assemblies spaced apart from rows of second sink electrode panel assemblies, wherein the panel assemblies each have a a panel width greater than the panel thickness, and the gap between like electrode assemblies arranged end to end along the width dimension within a row is less than said panel width to thereby approximate a planar surface electrode, and;

applying an electrical potential difference between the first source electrodes and second sink electrodes.

22. The method of claim 21 wherein the electrode assemblies are the assemblies of claim 12.

23. A treatment assembly useful for removing contaminant from soil comprising:

an elongated rectangular panel assembly having a width greater than its thickness, the panel comprising;

an elongated, perforated core containing an elongated channel enclosed with a permeable geotextile for passing fluid to and from the channel while retarding the flow of soil into the channel;

the channel containing a flowable solid treatment medium for treating the contaminant in the soil.

24. The treatment assembly of claim 23 further comprising a conduit disposed at one end and along the length of the elongated channel for directing fluid from the one end to the opposite end of the channel.

25. A treatment assembly with a removable portion for decontaminating soil, comprising:

an elongated container having an elongated perforated chamber enclosed by an elongated geotextile for passing fluid to or from the chamber while retarding the flow of soil into the chamber;

an elongated panel having a perforated core containing an elongated channel and a permeable geotextile enclosing the core for passing fluid to and from the channel while retarding the flow of a treatment media from the channel, the elongated panel slideably fitting in the elongated chamber;

a flowable treatment media filling the elongated channel for treating a soil contaminant while remaining within the elongated panel.

26. The treatment assembly of claim 25 further comprising a conduit disposed at one end and along the length of the elongated channel for directing fluid from the one end to the opposite end of the channel.

27. A method using electrodes to provide electroosmotic flow to decontaminate a region of soil comprising the steps of:

arranging a plurality of electrode assemblies in rows of source electrode assemblies spaced apart from rows of sink electrode assemblies;

applying an electrical potential difference between the source electrodes and sink electrodes to established a current path between the electrodes and the soil;

directing a first fluid in an open channel between the source electrode and the soil to thereby intersect the path of the current between the source electrode and the soil, electro-osmotically urging a first portion of said first fluid from the source electrodes toward the sink electrodes;

circulating a second remaining portion of said fluid in said open channel along the length of the source electrode assemblies, from one end to the opposite end of each of the electrodes of the source electrode assemblies;

withdrawing the second portion of said fluid from the source electrode assemblies.

28. The method of claim 27 further comprising providing a fluid conditioning additive to the fluid.

29. The method of claim 27 wherein circulating a second remaining portion of said fluid includes circulating the second portion at a flow rate which is greater than the flow rate of the electroosmotically urged first portion of fluid.

30. The method of claim 27 further comprising treating the withdrawn fluid, and;

redirecting the treated fluid to the source electrode assembly.

31. The method of claim 27 further comprising the steps of:

directing a second fluid to the sink electrode assemblies in a channel between the sink electrode and the soil thereby intersecting the path of the current between the sink electrode and the soil, and;

receiving at the sink electrode said electroosmotically urged first portion of fluid from the source electrode;

circulating said second fluid in said channel along the length of the sink electrode assemblies, from one end to the opposite end of each of the electrodes of the sink electrode assemblies;

withdrawing the second fluid and the electroosmotically urged first portion of fluid from the sink electrode assemblies.

32. The method of claim 31, further comprising directing a treated fluid to one end of the sink electrode assembly, and;

withdrawing the fluid from the opposite end of the sink electrode assembly.

33. The method of claim 27, wherein the gap distance between like electrode assemblies within a row is less than 50% of the gap distance between unlike electrode assemblies from row to row.

* * * * *